(12) United States Patent
Kani et al.

(10) Patent No.: US 8,951,683 B2
(45) Date of Patent: Feb. 10, 2015

(54) HYDROGEN GENERATOR, FUEL CELL SYSTEM INCLUDING HYDROGEN GENERATOR, AND METHOD FOR OPERATING HYDROGEN GENERATOR

(75) Inventors: Yukimune Kani, Osaka (JP); Kunihiro Ukai, Nara (JP); Yuji Mukai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 874 days.

(21) Appl. No.: 12/989,780

(22) PCT Filed: Mar. 2, 2010

(86) PCT No.: PCT/JP2010/001427
§ 371 (c)(1),
(2), (4) Date: Oct. 26, 2010

(87) PCT Pub. No.: WO2010/100903
PCT Pub. Date: Sep. 10, 2010

(65) Prior Publication Data
US 2011/0039172 A1 Feb. 17, 2011

(30) Foreign Application Priority Data
Mar. 2, 2009 (JP) ................................ 2009-048068

(51) Int. Cl.
H01M 8/06 (2006.01)
C01B 3/38 (2006.01)
H01M 8/04 (2006.01)

(52) U.S. Cl.
CPC ........... *C01B 3/384* (2013.01); *H01M 8/04776* (2013.01); *H01M 8/0612* (2013.01);
(Continued)

(58) Field of Classification Search
None
See application file for complete search history.

(56) References Cited

U.S. PATENT DOCUMENTS

| | | | |
|---|---|---|---|
| 2001/0002248 A1 | 5/2001 | Ukai et al. | |
| 2004/0131540 A1* | 7/2004 | Fujii et al. | 423/650 |
| 2005/0164046 A1* | 7/2005 | Fujihara et al. | 429/12 |
| 2007/0101647 A1 | 5/2007 | Miyauchi et al. | |
| 2009/0087701 A1 | 4/2009 | Kuwaba | |
| 2009/0269629 A1* | 10/2009 | Kani et al. | 429/17 |
| 2010/0062294 A1 | 3/2010 | Tamura | |

FOREIGN PATENT DOCUMENTS

| | | |
|---|---|---|
| CN | 1860078 A | 11/2006 |
| EP | 1 316 529 A1 | 6/2003 |

(Continued)

OTHER PUBLICATIONS

Extended European Search Report issued in Application No. 10748502.1 dated Apr. 4, 2013.

(Continued)

*Primary Examiner* — Jonathan Crepeau
(74) *Attorney, Agent, or Firm* — McDermott Will & Emery LLP

(57) ABSTRACT

A hydrogen generator of the present invention includes: a raw material supplying device (4) configured to supply a raw material; a water supplying device (3) configured to supply water; an evaporator (23) configured to evaporate the water supplied from the water supplying device (3) to generate steam; a reformer (20) having a reforming catalyst which generates a hydrogen-containing gas by a reforming reaction using the raw material and the steam; a valve (12) disposed on a gas passage to cause the reformer (20) to be communicated with an atmosphere and block the reformer (20) from the atmosphere, the gas passage being located downstream of the reformer (20); and a controller (11) configured to stop supplying the water from the water supplying device (3), then continue to supply the raw material from the raw material supplying device (4) with the valve (12) open, and stop supplying the raw material from the raw material supplying device (4) and close the valve (12) before an inside of the reformer (20) is purged with the raw material.

13 Claims, 10 Drawing Sheets

(52) U.S. Cl.
CPC . *C01B2203/0233* (2013.01); *C01B 2203/0283* (2013.01); *C01B 2203/044* (2013.01); *C01B 2203/047* (2013.01); *C01B 2203/066* (2013.01); *C01B 2203/0811* (2013.01); *C01B 2203/1282* (2013.01); *C01B 2203/1288* (2013.01); *C01B 2203/1294* (2013.01); *C01B 2203/1619* (2013.01); *C01B 2203/169* (2013.01); *Y02E 60/50* (2013.01)
USPC ............................ 429/423; 429/429; 423/652

(56) References Cited

FOREIGN PATENT DOCUMENTS

| | | |
|---|---|---|
| EP | 1 538 126 A1 | 6/2005 |
| JP | 2000-095504 | 4/2000 |
| JP | 2000-095504 * | 10/2000 ............... C01B 3/38 |
| JP | 2000-290001 | 10/2000 |
| JP | 2001-180908 | 7/2001 |
| JP | 2002-008701 | 1/2002 |
| JP | 2002-151124 | 5/2002 |
| JP | 2004-307236 | 11/2004 |
| JP | 2005-206395 A | 8/2005 |
| JP | 2005-209642 * | 8/2005 |
| JP | 2005-216500 | 8/2005 |
| JP | 2006-335623 | 12/2006 |
| JP | 2007-254251 | 10/2007 |
| WO | WO 2007/145321 A1 | 12/2007 |
| WO | WO/2007/148699 * | 12/2007 ............... H01M 8/06 |

OTHER PUBLICATIONS

Chinese Office Action issued in Application No. 201080001483.7 with mailing date May 6, 2013.

* cited by examiner

US 8,951,683 B2

HYDROGEN GENERATOR, FUEL CELL SYSTEM INCLUDING HYDROGEN GENERATOR, AND METHOD FOR OPERATING HYDROGEN GENERATOR

RELATED APPLICATIONS

This application is the U.S. National Phase under 35 U.S.C. §371 of International Application No. PCT/JP2010/001427, filed on Mar. 2, 2010, which in turn claims the benefit of Japanese Application No. 2009-048068, filed on Mar. 2, 2009, the disclosures of which Applications are incorporated by reference herein.

TECHNICAL FIELD

The present invention relates to a hydrogen generator configured to use a raw material to generate a hydrogen-containing gas, a fuel cell system including the hydrogen generator, and a method for operating the hydrogen generator.

BACKGROUND ART

A fuel cell system which is small in size and capable of performing highly efficient electric power generation has been diligently developed as a power generating system of a distributed energy supply source.

An infrastructure for supplying a hydrogen gas as a fuel necessary during an electric power generating operation of the fuel cell system is not constructed as an existing infrastructure. Therefore, a hydrogen generator configured to generate a hydrogen-containing gas using a raw material, such as a city gas or a propane gas, supplied from the existing infrastructure is normally disposed together with the fuel cell system.

The hydrogen generator includes a reformer configured to use a Ru catalyst or a Ni catalyst to cause a reforming reaction between the raw material and steam at 600 to 700° C. The hydrogen-containing gas is generated by the reforming reaction of the reformer. In addition, the hydrogen generator includes a shift converter portion configured to use a Cu—Zn based catalyst or a precious metal based catalyst to cause a shift reaction between carbon monoxide of the hydrogen-containing gas and the steam at 200 to 350° C., thereby reducing the carbon monoxide. Further, the hydrogen generator includes a reaction portion, such as a selective oxidizer, configured to use the Ru catalyst or a Pt catalyst to cause a selective oxidation reaction of the carbon monoxide at 100 to 200° C., thereby further reducing the carbon monoxide in the hydrogen-containing gas.

It is known that even after the fuel cell system stops and the supply of the raw material and water to the reformer stops, volume expansion of the water in an evaporator occurs by remaining heat of the hydrogen generator, and a residual gas in the reformer is purged (see PTL 1, for example).

CITATION LIST

Patent Literature

PTL 1: Japanese Laid-Open Patent Application Publication No. 2007-254251

SUMMARY OF INVENTION

Technical Problem

In the hydrogen generator described in PTL 1, the inside of the reformer becomes a steam atmosphere by a high-temperature state just after the stop. Such state is not preferable since the reforming catalyst may deteriorate by steam oxidation.

The present invention was made in light of the above circumstances, and an object of the present invention is to provide a hydrogen generator, a fuel cell system, and a method for operating the hydrogen generator, each of which suppresses than before the deterioration of the reforming catalyst by the steam oxidation during the stop.

Solution to Problem

In order to solve the above conventional problem, a hydrogen generator according to the present invention includes: a raw material supplying device configured to supply a raw material; a water supplying device configured to supply water; an evaporator configured to evaporate the water supplied from the water supplying device to generate steam; a reformer having a reforming catalyst which generates a hydrogen-containing gas by a reforming reaction using the raw material and the steam; a valve disposed on a gas passage to cause the reformer to be communicated with an atmosphere and block the reformer from the atmosphere, the gas passage being located downstream of the reformer; and a controller configured to stop supplying the water from the water supplying device, then continue to supply the raw material from the raw material supplying device with the valve open, and stop supplying the raw material from the raw material supplying device and close the valve before an inside of the reformer is purged with the supplied raw material.

Moreover, the hydrogen generator according to the present invention may further include: a combustor configured to heat the reformer; a discharging passage through which the gas discharged from the reformer flows, the discharging passage being communicated with the combustor; and a combustion detector configured to detect a combustion status of the combustor by an ion current, wherein the controller may stop supplying the raw material from the raw material supplying device and close the valve in a case where the combustion detector detects the ion current that is equal to or higher than a predetermined threshold.

Moreover, in the hydrogen generator according to the present invention, depending on an operating condition of the hydrogen generator before the water supplying device stops supplying the water, the controller may control a time in which the raw material supplying device continues to supply the raw material.

Moreover, in the hydrogen generator according to the present invention, the operating condition of the hydrogen generator may be a raw material supply amount, a water supply amount, or an operating time of the hydrogen generator.

Moreover, in the hydrogen generator according to the present invention, the controller may be configured to control the raw material supplying device such that the inside of the reformer is purged with the raw material in a case where a temperature inside the reformer becomes equal to or lower than a predetermined temperature after the valve is closed, the predetermined temperature being a temperature at which carbon deposition by the raw material does not occur.

Moreover, in the hydrogen generator according to the present invention, the controller may stop supplying the raw material from the raw material supplying device and close the valve before the evaporator stops generating the steam.

Moreover, in the hydrogen generator according to the present invention, the controller may continue to supply the raw material from the raw material supplying device until the evaporator stops generating the steam.

Further, in the hydrogen generator according to the present invention, the controller may continue to supply the raw material from the raw material supplying device at least until the evaporator stops generating the steam.

Moreover, a fuel cell system according to the present invention includes: the above hydrogen generator; and a fuel cell configured to generate electric power using the hydrogen-containing gas supplied from the hydrogen generator.

Further, a method for operating a hydrogen generator according to the present invention is a method for operating a hydrogen generator, the hydrogen generator including: a raw material supplying device configured to supply a raw material; a water supplying device configured to supply water; an evaporator configured to evaporate the water supplied from the water supplying device to generate steam; a reformer having a reforming catalyst which generates a hydrogen-containing gas by a reforming reaction using the raw material and the steam; and a valve disposed on a gas passage to cause the reformer to be communicated with an atmosphere and block the reformer from the atmosphere, the gas passage being located downstream of the reformer, the method comprising the steps of: (a) stopping supplying the water from the water supplying device; (b) after Step (a), continuing to supply the raw material from the raw material supplying device with the valve open; and (c) stopping supplying the raw material from the raw material supplying device and closing the valve before an inside of the reformer is purged with the raw material.

The above object, other objects, features and advantages of the present invention will be made clear by the following detailed explanation of preferred embodiments with reference to the attached drawings.

Advantageous Effects of Invention

The present invention can provide a hydrogen generator configured to suppress than before the deterioration of the reforming catalyst by the steam oxidation during the stop, a fuel cell system including the hydrogen generator, and a method for operating the hydrogen generator.

DESCRIPTION OF EMBODIMENTS

Figure 1:
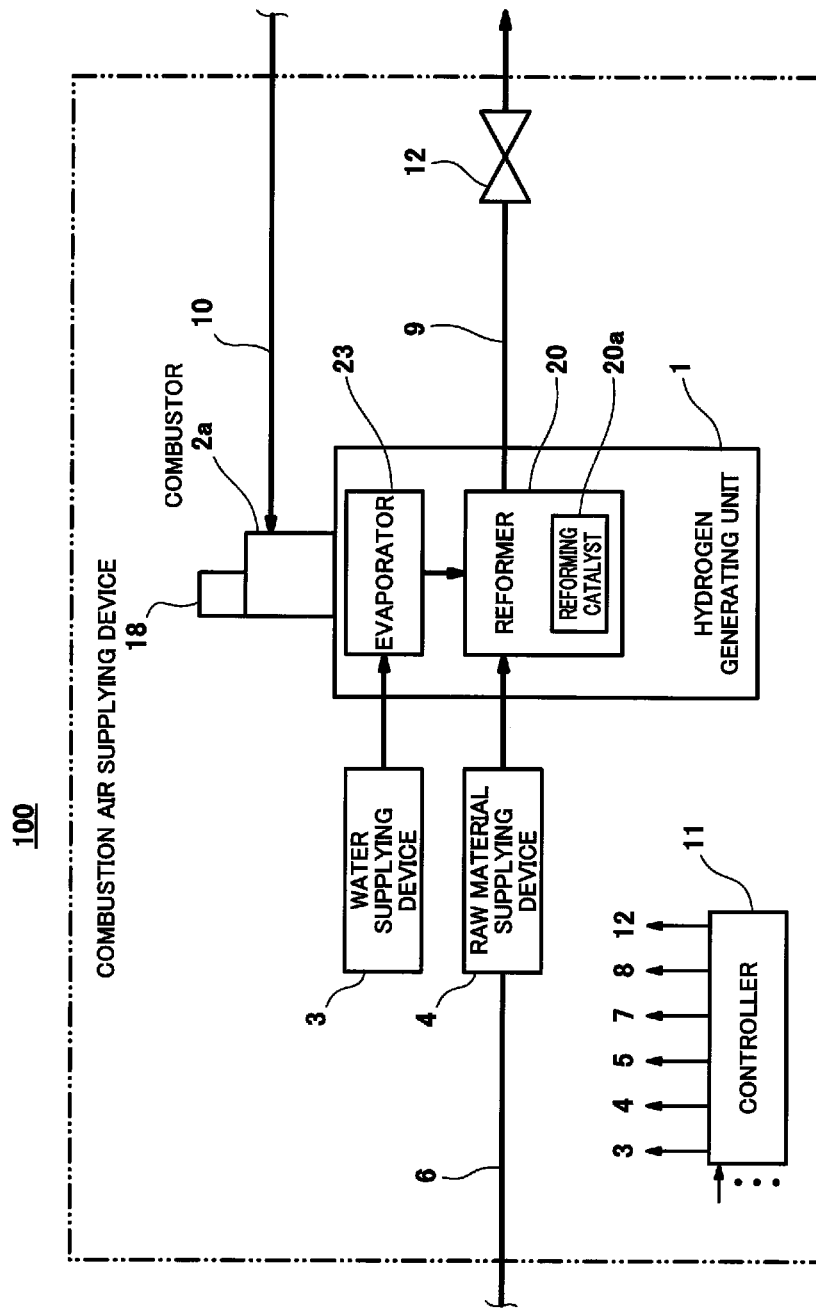
FIG. 1 is a block diagram schematically showing the configuration of a hydrogen generator according to Embodiment 1 of the present invention.

Hereinafter, embodiments for carrying out the present invention will be specifically explained in reference to the drawings. In the drawings, the same reference signs are used for the same or corresponding components, and a repetition of the same explanation is avoided. Moreover, in the drawings, only the components necessary for explaining the present invention are shown, and the other components are omitted. Further, the present invention is not limited to the following embodiments.

Embodiment 1

Configuration of Hydrogen Generator

FIG. 1 is a block diagram schematically showing the configuration of a hydrogen generator according to Embodiment 1 of the present invention.

As shown in FIG. 1, a hydrogen generator 100 according to Embodiment 1 of the present invention includes: a raw material supplying device 4 configured to supply a raw material; a water supplying device 3 configured to supply water; an evaporator 23 configured to evaporate the water supplied from the water supplying device 3 to generate steam; a reformer 20 having a reforming catalyst 20a which generates a hydrogen-containing gas by a reforming reaction using the raw material and the steam; a valve 12 disposed on a gas passage 9 to cause the reformer 20 to be communicated with the atmosphere and block the reformer 20 from the atmosphere, the gas passage 9 being located downstream of the reformer 20; and a controller 11. Moreover, a hydrogen generating unit 1 includes a combustor 2a, the reformer 20, and the evaporator 23.

Then, the controller 11 is configured to stop supplying the water from the water supplying device 3, then continue to supply the raw material from the raw material supplying device 4 with the valve 12 open, and stop supplying the raw material from the raw material supplying device 4 and close the valve 12 before an inside of the reformer 20 is purged with the supplied raw material.

Here, the raw material may be any material as long as the hydrogen-containing gas can be generated by the reforming reaction between the raw material and the steam. Used as the raw material is a material containing an organic compound having at least carbon and hydrogen as constituent elements. Examples are hydrocarbons, such as ethane and propane, and alcohol based raw materials, such as methanol. The above raw material may contain hydrocarbon having two or more carbons. Examples of the hydrocarbon having two or more carbons are ethane and propane. Moreover, in a case where a liquid raw material, such as methanol, is used as the raw material to be supplied, the liquid raw material is supplied into the reformer 20, and the liquid raw material is evaporated and supplied as a gas. This is because the inside of the reformer 20 is high in temperature.

The raw material supplying device 4 is connected to a gas infrastructure line 6 and is configured to supply the raw material to the reformer 20 while adjusting its flow rate. The raw material supplying device 4 may have any configuration as long as it can supply the raw material while adjusting the flow rate and block the supply of the raw material. For example, the raw material supplying device may be constituted by a flow rate control valve or a combination of a booster pump and the flow rate control valve.

The water supplying device 3 is configured to supply the water, supplied from a water supply source (for example, a water system or a water tank) and purified by a purifier, to the evaporator 23 while adjusting its flow rate. The water supplying device 3 may have any configuration as long as it can supply the water while adjusting the flow rate and block the supply of the water. For example, the water supplying device 3 may be constituted by the flow rate control valve or a combination of a pump and the flow rate control valve. Moreover, the evaporator 23 is configured to have the remaining heat even after the stop of a hydrogen-containing gas generating operation and evaporate the water, supplied from the water supplying device 3, to supply the steam to the reformer 20.

A combustion gas supplying passage 10 through which a combustion fuel is supplied and a combustion air supplying device 18 configured to supply combustion air are connected to the combustor 2a. A fan, such as a blower or a sirocco fan, can be used as the combustion air supplying device 18. Then, the combustion fuel (such as the raw material or the hydrogen-containing gas discharged from the reformer 20) and the combustion air are supplied to the combustor 2a and are combusted in the combustor 2a. Thus, a flue gas is generated. After the generated flue gas heats the reformer 20 and the evaporator 23, it flows through a flue gas passage (not shown) to be discharged to the outside of the hydrogen generator 100. Examples of the combustion fuel are the raw material and the hydrogen-containing gas generated in the reformer 20.

The reformer 20 includes the reforming catalyst 20a. For example, the reforming catalyst 20a is a material which catalyzes the steam-reforming reaction generating the hydrogen-containing gas from the raw material and the steam. Used as the reforming catalyst 20a is a ruthenium based catalyst in which a catalyst carrier, such as alumina, supports ruthenium (Ru), a nickel based catalyst in which the catalyst carrier supports nickel (Ni), or the like. In order to reduce the cost, it is preferable that a nickel based catalyst containing a nickel element as a catalyst metal be used as the reforming catalyst. Then, in the reforming catalyst 20a of the reformer 20, the hydrogen-containing gas is generated by the reforming reaction between the raw material supplied from the raw material supplying device 4 and the steam supplied from the evaporator 23. The generated hydrogen-containing gas is supplied through the gas passage 9 to a hydrogen utilizing device (such as a fuel cell or a hydrogen storage tank). In the present specification, the hydrogen-containing gas contains gases, such as the hydrogen gas, the raw material, and the steam.

The valve 12 configured to cause the reformer 20 to be communicated with the atmosphere through the gas passage 9 and block the reformer 20 from the atmosphere is disposed on a portion of the gas passage 9. The valve 12 may have any configuration as long as it can cause the reformer 20 to be communicated with the atmosphere and block the reformer 20 from the atmosphere. For example, an on-off valve, such as a solenoid valve, can be used as the valve 12.

The controller 11 may have any configuration as long as it can control the combustor 2a, the water supplying device 3, the raw material supplying device 4, the valve 12, and the combustion air supplying device 18. For example, the control unit 11 can be constituted by a microprocessor, a CPU, or the like. The controller 11 may be constituted by one controller or a group of a plurality of controllers which cooperate to execute the control of the hydrogen generator 100. Moreover, the controller 11 may include not only a calculation processing portion, such as the microprocessor or the CPU, but also a storage portion, such as a memory, and a timer portion.

Operation of Hydrogen Generator

Next, the operation of the hydrogen generator 100 according to Embodiment 1 will be explained in reference to FIG. 2. The following will explain a stop process of the hydrogen generator 100. Since the hydrogen-containing gas generating operation of the hydrogen generator 100 according to Embodiment 1 is carried out in the same manner as the hydrogen-containing gas generating operation of the common hydrogen generator 100, an explanation thereof is omitted.

Figure 2:
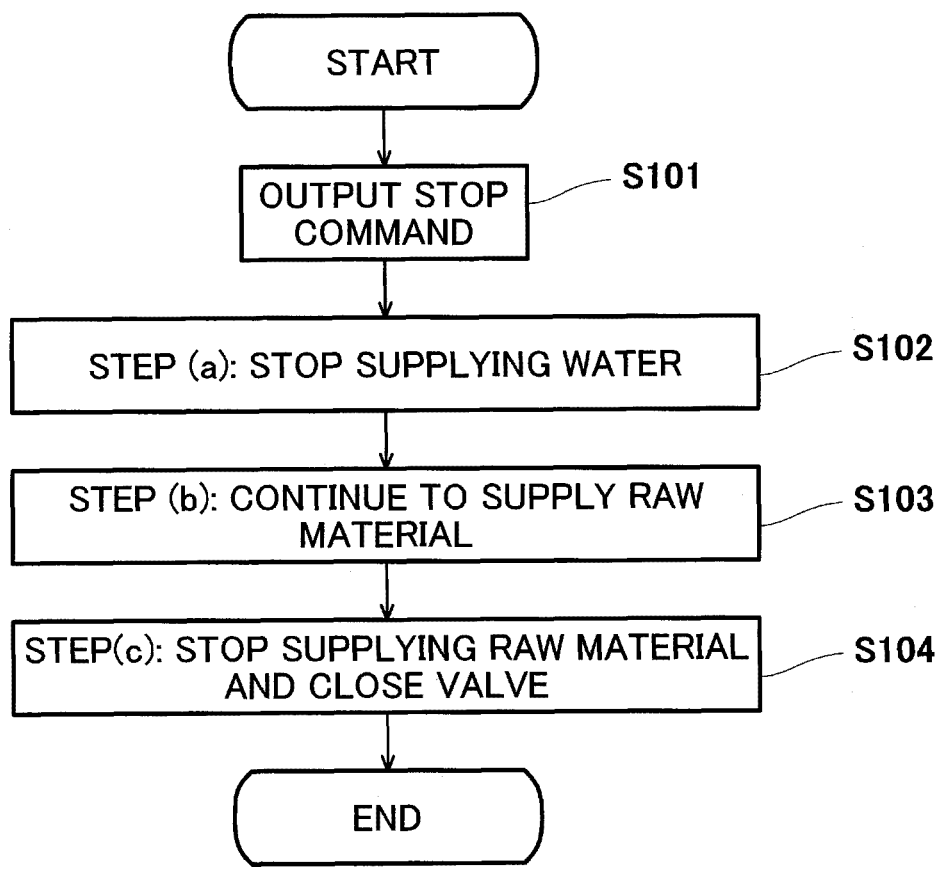
FIG. 2 is a flow chart schematically showing an operation stop process of the hydrogen generator shown in FIG. 1.

FIG. 2 is a flow chart schematically showing an operation stop process of the hydrogen generator 100 shown in FIG. 1.

First, a stop command is output to the hydrogen generator 100 when it is determined that the generation of the hydrogen-containing gas is unnecessary any more in accordance with the electric power load of each home, the electric power load being reduced by, for example, stopping the operation of an external device, such as a fuel cell (Step S101).

Next, when the stop command is output to the hydrogen generator 100, the controller 11 causes the water supplying device 3 to stop supplying the water (Step S102: Step (a)). At this time, although the supply of the water from the water supplying device 3 to the evaporator 23 stops immediately, the water remaining in the evaporator 23 turns into steam by the remaining heat of the evaporator 23, and the steam is supplied to the reformer 20. On this account, in a case where the supply of the raw material from the raw material supplying device 4 to the reformer 20 stop at the substantially same time as the stop of the supply of the water from the water supplying device 3 to the reformer 20, the inside of the reformer 20 may become a steam atmosphere by the steam generated in the evaporator 23 from the remaining water, the reforming catalyst 20a may be oxidized by the steam, and its catalyst characteristic may deteriorate.

Here, in the hydrogen generator 100 according to Embodiment 1, even after the controller 11 stops supplying the water from the water supplying device 3 to the evaporator 23, it continues to supply the raw material from the raw material supplying device 4 to the reformer 20 (Step S103: Step (b)). With this, the oxidation of the reforming catalyst 20a of the reformer 20 by the steam can be suppressed. Moreover, even if the temperature of the inside of the reformer 20 (to be precise, the temperature of the reforming catalyst 20a) is within a temperature range in which the carbon derived from the raw material deposits on the surface of the reforming catalyst 20a, the deposition of the carbon on the surface of the reforming catalyst 20a can be suppressed. This is because the raw material and the steam exist in the reformer 20. As compared to conventional hydrogen generators, a raw material supply amount in Step S103 is any amount in order to suppress the degree of the steam oxidation of the reforming catalyst 20a, but in order to suppress the occurrence of the steam oxidation of the reforming catalyst 20a, it is preferable that the controller 11 control the raw material supplying device 4 such that the raw material supply amount with respect to a steam supply amount from the evaporator 23 to the reformer 20 in Step S103 (steam carbon ratio (S/C)) is a value (for example, S/C=10 or lower) at which the occurrence of the steam oxidation is suppressed. In addition, in order to suppress the carbon deposition on the reforming catalyst 20a from the raw material, it is preferable that the controller 11 control the raw material supply amount from the raw material supplying device 4 in Step S103 such that the S/C is a value (for example, S/C=2 or higher) at which the carbon deposition on the surface of the reforming catalyst 20a from the raw material is suppressed.

Next, the controller 11 stops supplying the raw material from the raw material supplying device 4 to the reformer 20 and closes the valve 12 to seal the gas passage including the reformer 20 (Step S104). Then, the controller 11 terminates the present program. With this, the air can be prevented from getting into the reformer 20 from the outside of the hydrogen generator 100.

The stop of the supply of the raw material from the raw material supplying device 4 to the reformer 20 may be carried out at any timing as long as it is carried out before the inside of the reformer 20 is purged with the raw material by the supply of the raw material from the raw material supplying device 4 to the reformer 20 after the stop of the supply of the water from the water supplying device 3 to the evaporator 23. With this, as compared to a case where the raw material is supplied to the reformer 20 until the inside of the reformer 20 is purged with the raw material, the carbon derived from the raw material can be prevented from being deposited on the surface of the reforming catalyst 20a.

As above, in the hydrogen generator 100 of Embodiment 1, the supply of the raw material from the raw material supplying device 4 to the reformer 20 stops after the stop of the supply of the water from the water supplying device 3 to the evaporator 23. With this, the raw material is supplied from the raw material supplying device 4 to the reformer 20 while the steam generated in the evaporator 23 is supplied to the reformer 20. On this account, as compared to the conventional hydrogen generator in which the supply of the raw material to the reformer 20 and the supply of the water to the reformer 20 stop at the same time, the oxidation of the reforming catalyst 20a of the reformer 20 by the steam can be suppressed.

In the hydrogen generator 100 according to Embodiment 1, the hydrogen-containing gas (reformed gas) generated in the reformer 20 is supplied to the hydrogen utilizing device. However, the present embodiment is not limited to this. The hydrogen-containing gas may be supplied to the hydrogen utilizing device after it has passed through a shift converter and carbon monoxide remover included in the hydrogen generating unit 1, the shift converter having a shift catalyst (such as a copper-zinc based catalyst) which reduces the carbon monoxide of the hydrogen-containing gas supplied from the reformer 20, the carbon monoxide remover having an oxidation catalyst (such as a ruthenium based catalyst) or a methanation catalyst (such as a ruthenium based catalyst).

Modification Example

Next, Modification Example of the hydrogen generator 100 according to Embodiment 1 will be explained.

The hydrogen generator 100 of Modification Example 1 is one example in which the controller 11 stops supplying the raw material from the raw material supplying device 4 before the steam generation in the evaporator 23 stops. Specifically, the hydrogen generator 100 of Modification Example 1 is the same in configuration as the hydrogen generator 100 according to Embodiment 1, and the controller 11 is configured to stop supplying the raw material from the raw material supplying device 4 to the reformer 20 before the steam generation in the evaporator 23 stops in Step S104 shown in FIG. 2.

Here, one example of a method for "stopping supplying the raw material before the steam generation in the evaporator 23 stops" is a method for stopping supplying the raw material before a time (hereinafter referred to as a "steam generation stop time") passes, the steam generation stop time being a time preset by experiments or the like, that is, a time until a flow meter disposed on the gas passage 9 to detect the flow rate of a gas detects a flow rate equal to the flow rate of the raw material supplied from the raw material supplying device 4. Another example is a method for stopping supplying the raw material before a time (hereinafter referred to as the "steam generation stop time") passes, the steam generation stop time being a time preset by experiments or the like, that is, a time until a flow meter disposed on the gas passage 9 to detect the flow rate of a gas does not detect the flow rate of the gas after blocking (stopping) the supply of the raw material from the raw material supplying device 4 and the supply of the water from the water supplying device 3 at the same time. A still another example is a method for stopping supplying the raw material from the raw material supplying device 4 to the reformer 20 before a time (hereinafter referred to as the "steam generation stop time") passes, the steam generation stop time being a time preset by experiments or the like, that is, a time until a pressure detector provided in the reformer 20 does not detect the pressure increase after blocking (stopping) the supply of the raw material from the raw material supplying device 4 and the supply of the water from the water supplying device 3 at the same time and closing the valve 12 to seal the gas passage including the reformer 20. A timing at which the controller 11 outputs the stop command of the supply of the raw material to the raw material supplying device 4 is any timing as long as it is within the steam generation stop time.

Even the hydrogen generator 100 of Modification Example 1 configured as above can obtain the same operational advantages as the hydrogen generator 100 according to Embodiment 1.

Moreover, the hydrogen generator 100 of Modification Example 2 is one example in which the controller 11 continues to supply the raw material from the raw material supplying device 4 at least until the steam generation in the evaporator 23 stops. Specifically, the hydrogen generator 100 of Modification Example 2 is the same in configuration as the hydrogen generator 100 according to Embodiment 1, and the controller 11 is configured to continue to supply the raw material from the raw material supplying device 4 to the reformer 20 at least until the steam generation in the evaporator 23 stops in Step S103 shown in FIG. 2.

Here, the phrase "continue to supply the raw material until the steam generation in the evaporator 23 stops" denotes that the supply of the raw material from the raw material supplying device 4 to the reformer 20 continues even after the steam generation in the evaporator 23 stops. A timing at which the controller 11 outputs the stop command of the supply of the raw material to the raw material supplying device 4 is any timing as long as it is within a period from after the steam generation in the evaporator 23 stops until the inside of the reformer 20 is purged with the raw material. Therefore, in the hydrogen generator 100 of Modification Example 2, for example, an integrated raw material supply amount after the steam generation stop time preset by the above method passes is measured, and the controller 11 stops the operation of the raw material supplying device 4 before the integrated supply amount reaches an amount by which the inside of the reformer 20 is purged. Used as a value of the integrated supply amount may be a direct value that is a time integration value of a measured value of the flow meter disposed on the gas passage 9 to detect the flow rate of the gas. Moreover, in a case where the raw material supply amount after the steam generation stop time passes is constant, an indirect value that is an integrated raw material supply time may be used as the value of the integrated supply amount.

Embodiment 2

Configuration of Hydrogen Generator 100

Figure 3:
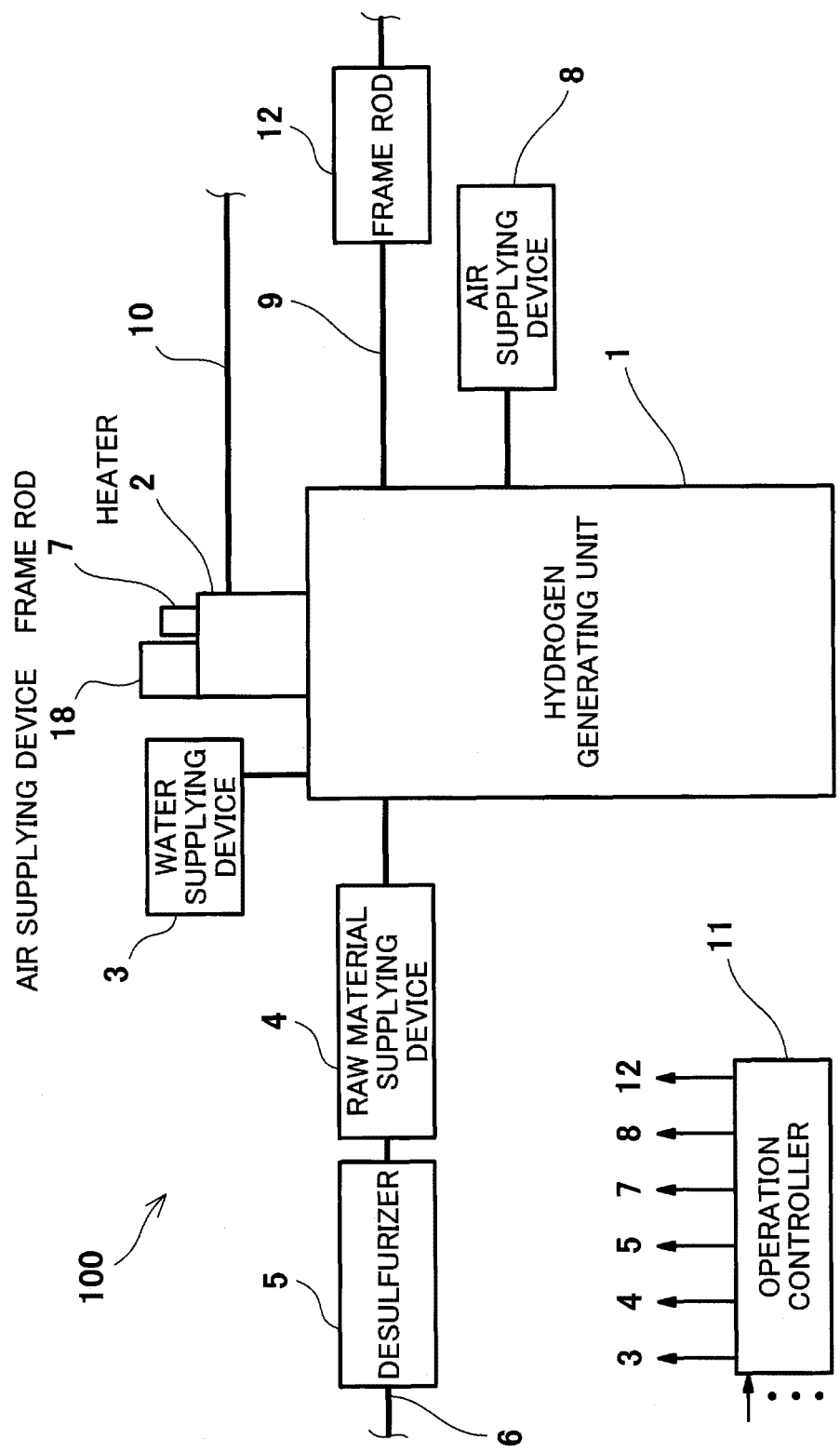
FIG. 3 is a block diagram schematically showing the configuration of the hydrogen generator according to Embodiment 2 of the present invention.

FIG. 3 is a block diagram schematically showing the configuration of the hydrogen generator according to Embodiment 2 of the present invention. In FIG. 3, only the components necessary for explaining the present invention are shown, and the other components are omitted.

The hardware configuration of the hydrogen generator 100 according to the present embodiment is the same as that of the conventional hydrogen generator.

To be specific, the hydrogen generator 100 according to the present embodiment includes the hydrogen generating unit 1 configured to generate the hydrogen-containing gas by the reforming reaction between the raw material and the steam, the raw material containing an organic compound having at least carbon and hydrogen as constituent elements. Moreover, the hydrogen generator 100 includes the raw material supplying device 4 configured to supply the raw material to the hydrogen generating unit 1 and control the flow rate (raw material flow rate) of the raw material and a desulfurizer 5 configured to remove a sulfur constituent contained in the raw material supplied to the raw material supplying device 4. Further, the hydrogen generator 100 includes the water supplying device 3 configured to supply the water to the hydrogen generating unit 1 and control the flow rate (water flow rate) of the water.

In the present embodiment, the raw material supplying device 4 includes a booster pump and is configured to be capable of adjusting the amount of raw material supplied to the hydrogen generating unit 1 by, for example, suitably controlling a current pulse, input electric power, or the like input to the booster pump. Moreover, as shown in FIG. 3, the raw material supplying device 4 is connected to the gas infrastructure line 6 of the city gas (methane gas, for example) that is a raw material supply source. The desulfurizer 5 is disposed on the gas infrastructure line 6. The raw material is supplied through the desulfurizer 5 and the raw material supplying device 4 to the hydrogen generating unit 1. To be specific, as shown in FIG. 3, the gas infrastructure line 6 through which the raw material is supplied is connected to the desulfurizer 5. In the present embodiment, the desulfurizer 5 is provided upstream of the raw material, and the raw material supplying device 4 is provided downstream of the raw material. However, the present embodiment is not limited to this. The arrangement order of the raw material supplying device 4 and the desulfurizer 5 may be suitably determined in consideration of the features of respective components. Moreover, the desulfurizer 5 may include a zeolite based adsorbent which removes the sulfur constituent (mainly an odorant component) of the raw material by adsorption or may use a hydrodesulfurization catalyst.

Moreover, in the present embodiment, the water supplying device 3 includes a pump capable of adjusting the flow rate. As with the raw material supplying device 4, the water supplying device 3 is configured to be capable of adjusting the amount of water supplied to the hydrogen generating unit 1 by suitably controlling a current pulse, input electric power, or the like input to the pump.

Here, the internal configuration of the hydrogen generating unit 1 will be explained.

Figure 4:
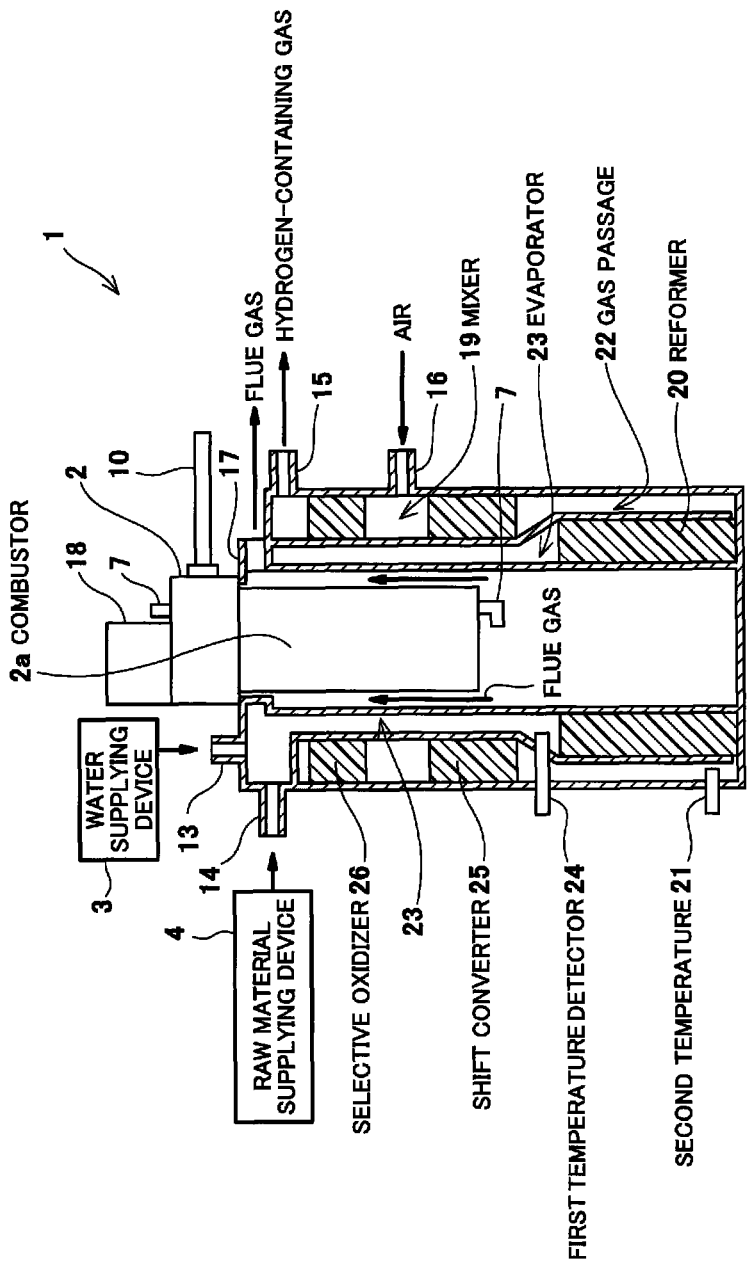
FIG. 4 is a cross-sectional view schematically showing the internal configuration of a hydrogen generating unit included in the hydrogen generator according to Embodiment 2 of the present invention.

FIG. 4 is a cross-sectional view schematically showing the internal configuration of the hydrogen generating unit included in the hydrogen generator according to Embodiment 2 of the present invention.

As shown in FIG. 4, the hydrogen generating unit 1 of the hydrogen generator 100 includes the evaporator 23 and a first temperature detector 24. The evaporator 23 is configured to evaporate the water supplied from the water supplying device 3 through a water supplying opening 13 and preheat and mix the generated steam and the raw material supplied from the raw material supplying device 4 through a material supplying opening 14. The first temperature detector 24 is configured to detect the temperature of a mixture of the raw material and the steam in the evaporator 23.

Moreover, as shown in FIG. 4, the hydrogen generating unit 1 includes the reformer 20 having a Ni based catalyst as the reforming catalyst and a second temperature detector 21 configured to detect the temperature of the hydrogen-containing gas in a gas passage 22 located just behind the reformer 20.

Moreover, as shown in FIG. 4, the hydrogen generating unit 1 includes a shift converter 25, a mixer 19, and a selective oxidizer 26. The shift converter 25 includes a Cu—Zn based catalyst and is configured to reduce a carbon monoxide concentration of the hydrogen-containing gas by the shift reaction between the carbon monoxide of the hydrogen-containing gas generated in the reformer 20 and the steam. The mixer 19 supplies the air from an air supplying device 8 through an air supplying opening 16 to the hydrogen-containing gas discharged from the shift converter 25 and mixes the air and the hydrogen-containing gas. The selective oxidizer 26 includes a Ru based catalyst and is configured to remove mainly by the oxidation the carbon monoxide remaining in the hydrogen-containing gas discharged from the mixer 19. The hydrogen-containing gas discharged from the selective oxidizer 26 is discharged through a hydrogen-containing gas outlet port 15 to the outside of the hydrogen generator 100. In the present embodiment, specific configurations of the reformer 20, the shift converter 25, and the selective oxidizer 26 are the same as general configurations thereof. Therefore, further detailed explanations of the reformer 20, the shift converter 25, and the selective oxidizer 26 are omitted herein. Moreover, in the present embodiment, the first temperature detector 24 is provided. However, the present embodiment is not limited to this, and the first temperature detector 24 may not be provided.

Moreover, as shown in FIGS. 3 and 4, the hydrogen generating unit 1 includes a heater 2 configured to supply reaction heat necessary for the reforming reaction in the reformer 20. Then, the heater 2 includes the combustor 2a (burner, for example) configured to combust a combustion gas that is a heat source, an ignitor (not shown) that is an ignition source of the combustor 2a, a flame rod 7 (combustion detector) configured to detect a combustion status of the combustion gas in the combustor 2a, and a combustion fan 18 configured to supply combustion air to the combustor 2a. Here, as shown in FIGS. 3 and 4, the combustion gas supplying passage 10 is connected to a predetermined position of the heater 2, and the combustion gas is supplied through the combustion gas supplying passage 10 to the combustor 2a of the heater 2. Moreover, the flue gas discharged from the combustor 2a moves upward in a space formed on an outer periphery of the combustor 2a to be discharged through a flue gas outlet port 17 of the hydrogen generating unit 1 to the outside of the hydrogen generating unit 1.

Here, the present embodiment is configured such that the hydrogen generating unit 1 includes the heater 2 configured to supply by the combustion reaction the heat necessary for the reforming reaction in the hydrogen generating unit 1, and the evaporator 23 is heated by the flue gas generated in the combustion reaction of the combustor 2a. Moreover, the flame rod 7 is a device configured to detect an ion current in flame (flue gas) generated by the combustion reaction in the combustor 2a. In the case of detecting only whether or not the combustion reaction in the combustor 2a is occurring, a temperature detector, such as a thermocouple, may be used instead of the flame rod 7 to detect the temperature of the flame, the temperature of the flue gas, or the like.

Moreover, as shown in FIG. 3, the combustion gas supplying passage 10 through which the combustion gas combusted in the heater 2 is supplied is connected to a predetermined position of the heater 2 included in the hydrogen generating unit 1. Moreover, a hydrogen-containing gas supplying passage 9 (gas passage) through which the hydrogen-containing gas is supplied to an external device, such as a fuel cell, not shown in FIG. 3, is connected to the hydrogen-containing gas outlet port 15 (see FIG. 4) of the hydrogen generating unit 1. Then, in order to prevent the inside of the hydrogen generating unit 1 from being communicated with the outside air through the hydrogen-containing gas supplying passage 9, the sealing unit (valve) 12 configured to use a solenoid valve to seal the hydrogen-containing gas supplying passage 9 is disposed on the hydrogen-containing gas supplying passage 9. In the present embodiment, the sealing unit 12 using the solenoid valve is explained as one example. However, the present embodiment is not limited to this configuration. For example, used as the sealing unit 12 instead of the solenoid valve may be a unit, such as a motor operated valve or a three-way valve using the solenoid valve and the motor operated valve, capable of sealing the hydrogen-containing gas supplying passage 9. Moreover, utilized as the combustion gas supplied through the combustion gas supplying passage 10 to the heater 2 is the raw material used for generating the hydrogen-containing gas, the hydrogen-containing gas generated by the hydrogen generator 100, or the hydrogen-containing gas (off gas) unconsumed in the external device, such as the fuel cell.

Moreover, as described above, the hydrogen generator 100 includes the air supplying device 8 configured to supply the air to the hydrogen generating unit 1 and suitably control the flow rate of the air. The air supplying device 8 includes a sirocco fan capable of adjusting the flow rate. As with the water supplying device 3 and the raw material supplying device 4, the air supplying device 8 is configured to be capable of adjusting the amount of air supplied to the hydrogen generating unit 1 by suitably controlling a current pulse, input electric power, or the like input to the sirocco fan.

Further, as shown in FIG. 3, the hydrogen generator 100 includes the operation controller (controller) 11 configured to suitably control the operation of the hydrogen generator 100. The operation controller 11 is electrically connected to predetermined components of the hydrogen generator 100 and controls the amount of raw material supplied from the raw material supplying device 4 to the hydrogen generating unit 1, the amount of water supplied from the water supplying device 3 to the hydrogen generating unit 1, the amount of air supplied from the air supplying device 8 to the hydrogen generating unit 1, and the like. Further, the operation controller 11 monitors a desulfurization performance of the desulfurizer 5, receives signals from the flame rod 7, and controls the operation of the sealing unit 12. The operation controller 11 stores, for example, operation information, such as a sequence of a start-up method, operating method, and stop method of the hydrogen generator 100, by using a semiconductor memory, a CPU, and the like, and suitably calculates an appropriate operating condition in accordance with situations. Then, the operation controller 11 outputs the appropriate operating condition to each of components, such as the water supplying device 3 and the raw material supplying device 4, necessary for the operation of the hydrogen generator 100.

In the present embodiment, the material gas (city gas) containing methane as the major component is used as the raw material. However, the present embodiment is not limited to this. The raw material may be any material as long as it is a raw material containing an organic compound, such as hydrocarbon, consisting of at least carbon and hydrogen. For example, LPG or kerosene may be used as the raw material.

Operation of Hydrogen Generator 100

Next, the operation of the hydrogen generator 100 according to Embodiment 2 of the present invention will be explained.

Regarding the operations of the hydrogen generator 100 according to the present embodiment, the operations from the start-up until the electric power generation are the same as those of the conventional hydrogen generator.

To be specific, in the case of starting up the hydrogen generator 100 from a stop state, the combustion gas is supplied through the combustion gas supplying passage 10 to the heater 2 and is ignited in the combustor 2a to start heating the hydrogen generating unit 1.

Next, the raw material supplying device 4 and the water supplying device 3 are activated to respectively supply the raw material and the water to the hydrogen generating unit 1, thereby starting the reforming reaction between the steam and the raw material. Here, in the present embodiment, a material gas containing methane as a major component is used as the raw material. Moreover, the amount of water supplied from the water supplying device 3 to the hydrogen generating unit 1 is controlled such that the steam is about 2.5 to 3 moles when the number of carbon atoms in an average molecular formula of the city gas is 1 mole. To be specific, the operation controller 11 of the hydrogen generator 100 controls the operations of the raw material supplying device 4 and water supplying device 3 such that the steam carbon ratio (S/C) is about 2.5 to 3.

Then, in the hydrogen generating unit 1, the steam-reforming reaction proceeds in the reformer 20, the shift reaction proceeds in the shift converter 25, and the selective oxidation reaction of the carbon monoxide proceeds in the selective oxidizer 26. The hydrogen-containing gas discharged from the selective oxidizer 26 is supplied through the hydrogen-containing gas supplying passage 9 to the external device, such as the fuel cell. For example, in the case of supplying the hydrogen-containing gas to a polymer electrolyte fuel cell that is the external device, the carbon monoxide concentration of the hydrogen-containing gas is reduced such that a volume concentration (dry gas base) of the carbon monoxide in the hydrogen-containing gas is reduced up to about 20 ppm or lower. Moreover, the amount of hydrogen-containing gas generated is controlled by adjusting the amount of raw material supplied to the hydrogen generating unit 1 and the amount of water supplied to the hydrogen generating unit 1. In the present embodiment, the hydrogen generating unit 1 includes both the shift converter 25 and the selective oxidizer 26. However, the present embodiment is not limited to this. For example, the hydrogen generating unit 1 may not include at least one of the shift converter 25 and the selective oxidizer 26 depending on the carbon monoxide concentration required by the external device. Here, in a case where the selective oxidizer 26 is not provided in the hydrogen generating unit 1, the air supplying device 8 is unnecessary.

Next, the method for stopping the hydrogen generator 100 according to Embodiment 2 of the present invention will be explained using the flow chart shown in FIG. 5.

Figure 5:
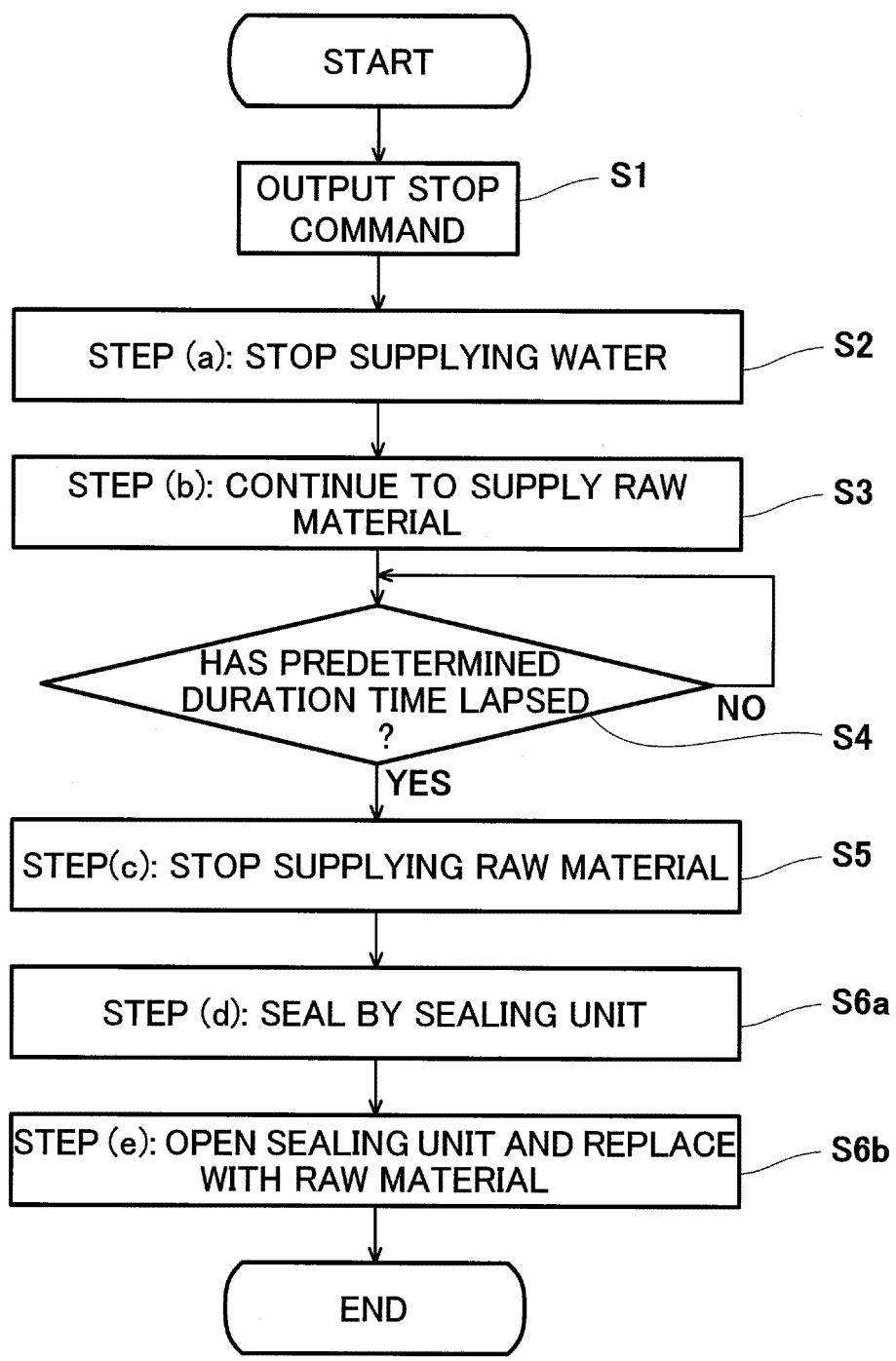
FIG. 5 is a flow chart schematically showing a characteristic operation stop method of the hydrogen generator according to Embodiment 2 of the present invention.

FIG. 5 is a flow chart schematically showing a characteristic operation stop method of the hydrogen generator according to Embodiment 2 of the present invention. FIG. 5 shows only one cycle of the characteristic operation stop method of the hydrogen generator.

First, the stop command is output to the hydrogen generator 100 when it is determined that the generation of the hydrogen-containing gas is unnecessary any more in accordance with the electric power load of each home, the electric power load being reduced by, for example, stopping the operation of the external device, such as the fuel cell (Step S1).

Next, when the stop command is output to the hydrogen generator 100, the operation controller 11 controls such that an operation step of the hydrogen generator 100 proceeds to Step (a), and the water supply from the water supplying device 3 to the evaporator 23 stops (Step S2).

In this case, although the water supply from the water supplying device 3 to the evaporator 23 stops immediately, the steam supply to the reformer 20 does not stop immediately, and the water remains in the evaporator 23. This is because in the hydrogen generating unit 1, the heat exchange between the flue gas and the water is performed to heat the water from a low-temperature state to a high-temperature state in a cascade manner and generate the steam since the energy efficiency of the reforming reaction improves. Therefore, in a case where the supply of the raw material from the raw material supplying device 4 to the reformer 20 stops substantially simultaneously with the stop of the water supply from the water supplying device 3 to the hydrogen generating unit 1 (evaporator 23), the catalyst of the reformer 20 is oxidized by the steam generated from the water remaining in the evaporator 23, and this deteriorates the catalyst characteristic.

Here, in the hydrogen generator 100 according to the present embodiment, the operation controller 11 controls such that the operation step of the hydrogen generator 100 proceeds to Step (b) in a state where the supply of the raw material from the raw material supplying device 4 to the reformer 20 continues (Step S3). At this time, the water remaining in the evaporator 23 turns into the steam by the remaining heat of the evaporator 23, and the steam is supplied to the reformer 20 and mixed with the raw material. As compared to conventional hydrogen generators, the raw material supply amount in Step (b) is any amount in order to suppress the degree of the steam oxidation of the reforming catalyst 20*a*, but in order to suppress the occurrence of the steam oxidation of the reforming catalyst 20*a*, it is preferable that the controller 11 control the raw material supplying device 4 such that the raw material supply amount with respect to the steam supply amount from the evaporator 23 to the reformer 20 in Step (b) (steam carbon ratio (S/C)) is a value (for example, S/C=10 or lower) at which the occurrence of the steam oxidation of the reforming catalyst 20*a* is suppressed. In addition, in order to suppress the carbon deposition on the reforming catalyst 20*a* from the raw material, it is preferable that the controller 11 control the raw material supply amount from the raw material supplying device 4 such that the S/C is a value (for example, S/C=2 or higher) at which the carbon deposition from the raw material is suppressed in Step (b).

Next, when the mixture of the steam and the raw material in the reformer 20 starts flowing by Step S3, the operation controller 11 determines whether or not a duration time (that is a time during which the supply of the raw material continues) during which the mixture of the steam and the raw material is flowing in the reformer 20 by continuing supplying the raw material has reached a predetermined duration time (Step S4). Here, when the operation controller 11 determines that the duration time during which the mixture of the steam and the raw material is flowing in the reformer 20 has not yet reached the predetermined duration time (No in Step S4), it controls such that Step S3 further continues.

In contrast, when the operation controller 11 determines that the duration time during which the mixture of the steam and the raw material is flowing in the reformer 20 has reached the predetermined duration time (Yes in Step S4), the operation controller 11 controls such that the operation step of the hydrogen generator 100 proceeds to Steps (c) and (d), the supply of the raw material from the raw material supplying device 4 to the reformer 20 stops in a state where the steam is flowing in the reformer 20, and the reformer 20 is sealed by the sealing unit 12 (Steps S5 and 6*a*). To be specific, the operation controller 11 simultaneously stops the raw material and the steam in the reformer 20.

Here, the "predetermined duration time" in Step S4 as a criteria for causing the operation step of the hydrogen generator 100 to proceed from Step (b) to Steps (c) and (d) by the operation controller 11 is set as a time in which an internal atmosphere of the sealed reformer 20 does not become an atmosphere (steam concentration) which causes the steam oxidation of the reforming catalyst 20*a*. This is because there is a possibility that the water remaining in the reformer 20 evaporates after the operation step of the hydrogen generator 100 proceeds to Step (c) (after the reformer 20 is sealed), the steam concentration in the reformer 20 increases, and the steam oxidation of the reforming catalyst 20*a* of the reformer 20 occurs. The internal atmosphere (steam concentration) which does not cause the oxidation of the catalyst by the steam is different depending on the type of catalyst and can be recognized in advance by changing the ratio of the steam flowing through the catalyst under the conditions of use by using, for example, an atmospheric fixed bed flow reactor and measuring the change in the catalyst characteristic. For example, the "predetermined duration time" in Step S4 is preferably a duration time in which in the case of the Ni based catalyst, the catalyst characteristic of the Ni based catalyst is unlikely to deteriorate, that is, a duration time in which the steam carbon ratio (S/C) of the internal atmosphere of the sealed reformer 20 is 10 or less. The "predetermined duration time" is different depending on the type of catalyst. In the present embodiment, a time necessary for evaporating the water steadily remaining in the hydrogen generating unit 1 in Step (b) is measured in advance, a time shorter than the time necessary for evaporating the remaining water is set as the predetermined duration time, and the operation step proceeds from Step (b) to Steps (c) and (d) after the predetermined duration time has passed.

As above, in the present embodiment, in Step (b) shown as Step S3, even if the water remaining in the hydrogen generating unit 1 evaporates, the raw material can flow through the reformer 20 together with the steam. Then, in Step (c) shown as Step S5, the supply of the raw material from the raw material supplying device 4 to the reformer 20 stops in a state where the steam and the raw material supplied from the raw material supplying device 4 are flowing through the reformer 20. With this, the deterioration of the catalyst characteristic by the carbon deposition on each catalyst of the reformer 20 and the steam oxidation of the catalyst can be effectively suppressed.

Step (d) is a step (Step S6*a*) in which as a step after Step (c) shown as Step S5, the operation controller 11 activates the sealing unit 12 (sealing by the sealing unit 12) in order to prevent the air from getting into the hydrogen generating unit 1 from the outside of the hydrogen generator 100. Here, regarding the proceeding from Step (c) to Step (d), Step (d) does not have to be carried out immediately after the Step (c). For example, in a case where the predetermined duration time in Step S4 is set as a time necessary for evaporating the remaining water in the reformer 20, and the operation step proceeds to Step (c) after the predetermined time has passed, the raw material in the reformer 20 is not discharged to the outside of the reformer 20 in accordance with the further evaporation of the remaining water. On this account, in this case, Step (d) does not have to be executed immediately after Step (c).

Next, when the sealing unit 12 is activated to seal the gas passage 9 in Step S6a, the operation controller 11 controls such that the operation step of the hydrogen generator 100 proceeds to Step (e) of Step S6b, the sealing unit 12 opens, the supply of the raw material from the raw material supplying device 4 to the hydrogen generating unit 1 (reformer 20) temporarily restarts, and the inside of the hydrogen generating unit 1 is replaced with the raw material (Step S6b). The proceeding from Step (d) to Step (e) may be managed by a parameter set such that the temperature detected by the second temperature detector 21 becomes a temperature (for example, 300° C. or lower in the case of the Ni based catalyst) at which the carbon deposition does not occur.

Here, one example of a method for setting a temperature at which the carbon derived from the raw material does not deposit on the surface of the reforming catalyst 20a is as follows: After the raw material flows through the catalyst at a predetermined temperature, the catalyst is combusted by high-frequency heating in an oxygen stream using EMIA-920V produced by Horiba, Ltd.; the amount of carbon deposited on the catalyst is measured by an infrared absorption method to determine the temperature at which the carbon deposition occurs; and the temperature at which the carbon derived from the raw material does not deposit on the surface of the reforming catalyst 20a is set to be equal to or lower than the temperature at which the carbon deposition occurs. Moreover, for example, after the raw material flows through the catalyst at a predetermined temperature, whether or not the carbon is deposited is determined by observing the catalyst using a transmission electron microscope, and the temperature at which the carbon derived from the raw material does not deposit can be set.

As above, by sequentially carrying out Step S6a after Steps S1 to S5, further effects can be obtained. For example, in a case where Step (d) of activating the sealing unit 12 is carried out in a state where a large amount of water remains in the evaporator 23 of the hydrogen generator 100, the inside of the hydrogen generating unit 1 becomes a high-pressure state by a large amount of steam generated by the evaporator 23. In order to deal with this, it is necessary to improve the pressure resistance of the hydrogen generating unit 1. However, as in the present embodiment, in a case where Step (d) of activating the sealing unit 12 is carried out after most of the water remaining in the evaporator 23 evaporates in Step S3, the pressure increase of the inside of the hydrogen generating unit 1 can be prevented. With this, the hydrogen generating unit 1 can be configured to have low pressure resistance, so that the structure thereof can be simplified.

In the present embodiment, the operation controller 11 controls such that the supply of the raw material and the supply of the steam stop simultaneously in the reformer 20 in Step S5 shown in FIG. 5. However, in the control of Step S5, the supply of the raw material may stop such that the amount of raw material supplied from the raw material supplying device 4 to the reformer 20 decreases gradually. Since the amount of water evaporation decreases as the remaining water decreases, it is preferable to decrease the supply amount of raw material in accordance with the decrease in the amount of water evaporation.

Modification Example

Next, Modification Example 1 of the operation of the hydrogen generator 100 according to Embodiment 2 of the present invention will be explained.

Modification Example 1 of Embodiment 2 is different from Embodiment 2 only in that the duration time of Step (b) shown as Step S3 is set so as to correspond to the operating condition of the hydrogen generator 100 before proceeding to Step (a) shown as Step S2 in FIG. 5. Therefore, only the difference from the operation of the hydrogen generator 100 shown in FIG. 5 will be explained herein.

Figure 6:
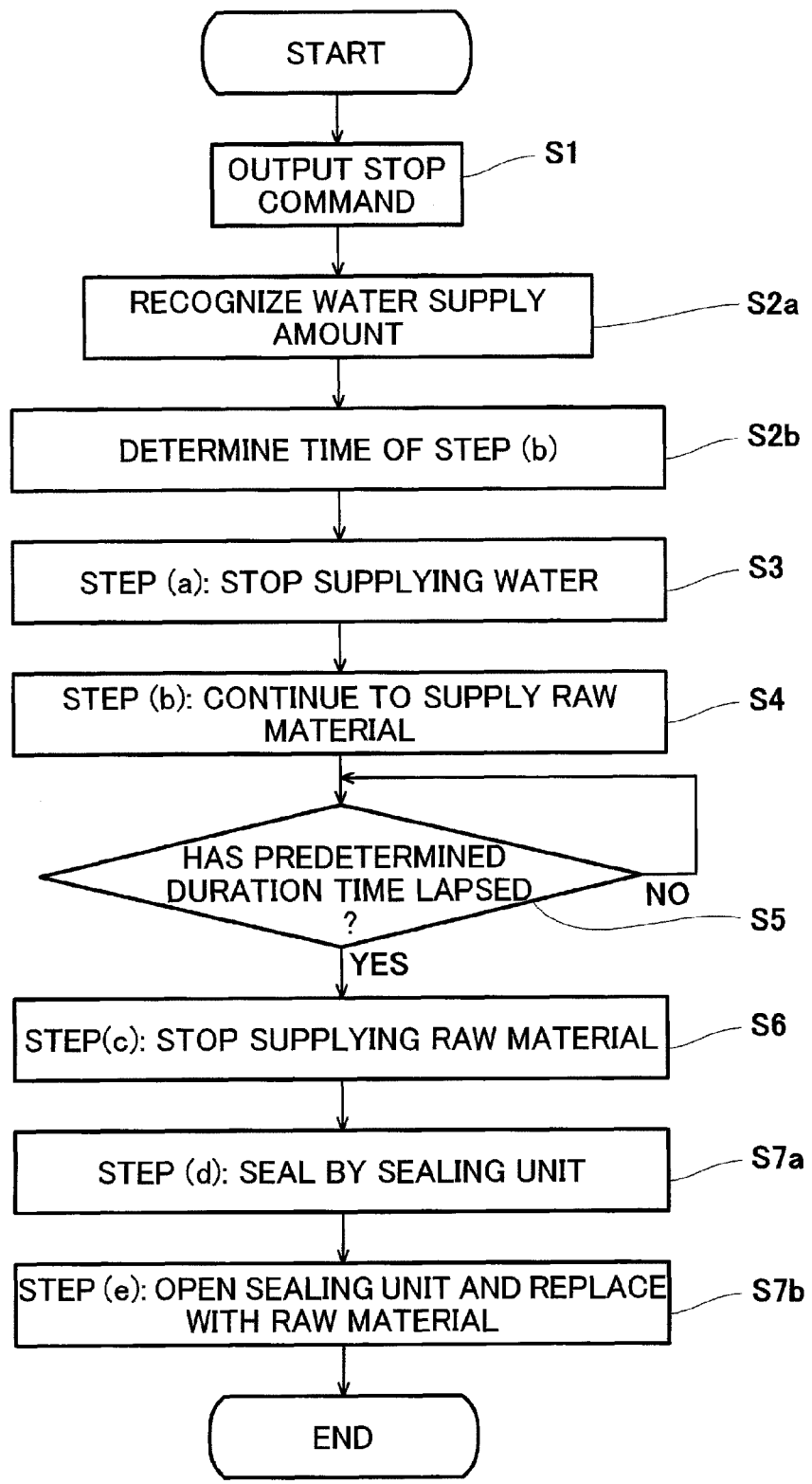
FIG. 6 is a flow chart schematically showing Modification Example 1 of the characteristic operation stop method of the hydrogen generator according to Embodiment 2 of the present invention.

FIG. 6 is a flow chart schematically showing Modification Example 1 of the characteristic operation stop method of the hydrogen generator according to Embodiment 2 of the present invention.

As shown in FIG. 6, in Modification Example 1 of Embodiment 2, when the stop command is output to the hydrogen generator 100 (Step S1), the operation controller 11 recognizes one of the operating conditions of the hydrogen generator 100, that is, the amount of water supplied from the water supplying device 3 to the evaporator 23 in a first stage (Step S2a) of Step S2 before proceeding to Step (a) shown as Step S3 in FIG. 6. In Step S2a, the operation controller 11 estimates the amount of water remaining in the evaporator 23 of the hydrogen generating unit 1. The amount of water supplied from the water supplying device 3 to the evaporator 23 can be recognized from the operation situation of the water supplying device 3.

Next, when the amount of water remaining in the evaporator 23 of the hydrogen generating unit 1 is estimated in Step S2a, the operation controller 11 calculates based on the estimated amount of water a time necessary for evaporating an appropriate amount of water in Step (b) shown as Step S4 in FIG. 6 to determine the duration time of Step (b) in a second stage (Step S2b) of Step S2. The predetermined duration time determined in Step S2b is stored in the semiconductor memory of the operation controller 11. The appropriate amount of water evaporation in Step (b) is defined as an amount necessary for preventing the internal atmosphere of the sealed reformer 20 from becoming an atmosphere (steam concentration) which causes the steam oxidation of the reforming catalyst.

Then, when the predetermined duration time is determined in Step S2b, the operation controller 11 sequentially executes Steps S3 to S7b as with the operations shown in Steps S2 to S6b of the hydrogen generator 100 shown in FIG. 5.

Here, in Embodiment 2, the amount of raw material supplied from the raw material supplying device 4 to the hydrogen generating unit 1 (reformer 20) is associated with the amount of water supplied from the water supplying device 3 to the evaporator 23. Here, in the present modification example, the amount of water remaining in the evaporator 23 may be estimated based on the operating condition of the hydrogen generator 100, that is, the amount of raw material supplied from the raw material supplying device 4 to the hydrogen generating unit 1 (reformer 20). This is because as described above, for example, the amount of raw material supplied to the hydrogen generating unit 1 is controlled to be associated with the amount of water supplied to the evaporator 23 in order to realize a predetermined S/C. Since the water supply amount can be indirectly recognized from the raw material supply amount, the amount of water remaining in the evaporator 23 can be estimated based on the water supply amount.

In Embodiment 2, the temperature of the evaporator 23 included in the hydrogen generating unit 1 increases in proportion to an elapsed time since the start-up of the hydrogen generator 100. For example, the temperature of the evaporator 23 is low when the elapsed time since the start-up of the hydrogen generator 100 is short whereas the temperature of the evaporator 23 is high when the elapsed time since the start-up of the hydrogen generator 100 is long. Here, in Modification Example 1, the amount of water remaining in the evaporator 23 may be estimated based on the operating condition of the hydrogen generator 100, that is, an operating time from the start-up of the hydrogen generator 100 until before the proceeding to Step (a) shown as Step S3 in FIG. 6 (before the output of the stop command). For example, immediately after the start-up of the hydrogen generator 100, the evaporator 23 is not adequately heated, and the amount of water remaining in the evaporator 23 is large. In this case, based on the operating time from the start-up of the hydrogen generator 100 until before the proceeding to Step (a), it is possible to appropriately recognize that a large amount of water remains in the evaporator 23.

In Embodiment 2, a heated state of the evaporator 23 can be recognized by the first temperature detector 24. Here, unlike Modification Example 1, the amount of water remaining in the evaporator 23 may be estimated based on the temperature detected by the first temperature detector 24 included in the hydrogen generating unit 1. Even with this configuration, the same effects as Modification Example 1 can be obtained.

The other points are the same as the operation of the hydrogen generator 100 shown in FIG. 5.

Next, Modification Example 2 of the operation of the hydrogen generator 100 according to Embodiment 2 of the present invention will be explained.

Modification Example 2 of Embodiment 2 is different from Embodiment 2 only in that a timing for proceeding to Step (c) shown as Step S5 in FIG. 5 is set so as to correspond to the operating condition of the hydrogen generator 100 before proceeding to Step (a) shown as Step S2 in FIG. 5. Therefore, only the difference from the operation of the hydrogen generator 100 shown in FIG. 5 will be explained herein.

Figure 7:
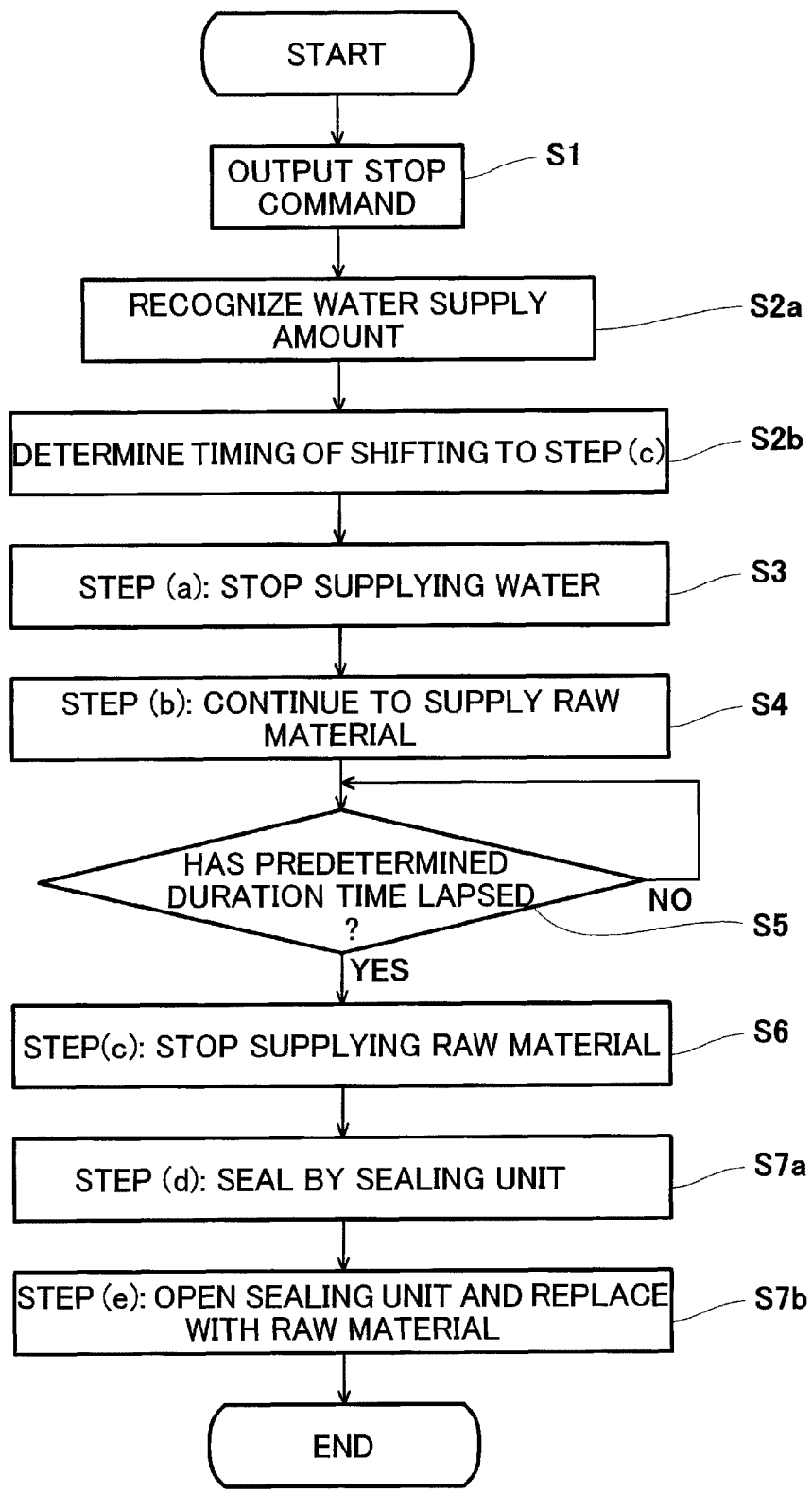
FIG. 7 is a flow chart schematically showing Modification Example 2 of the characteristic operation stop method of the hydrogen generator according to Embodiment 2 of the present invention.

FIG. 7 is a flow chart schematically showing Modification Example 2 of the characteristic operation stop method of the hydrogen generator according to Embodiment 2 of the present invention.

As shown in FIG. 7, in Modification Example 2 of Embodiment 2, when the stop command is output to the hydrogen generator 100 (Step S1), the operation controller 11 recognizes one of the operating conditions of the hydrogen generator 100, that is, the amount of water supplied from the water supplying device 3 to the evaporator 23 in the first stage (Step S2a) of Step S2 before proceeding to Step (a) shown as Step S3 in FIG. 7. In Step S2a, the operation controller 11 estimates the amount of water remaining in the evaporator 23 of the hydrogen generating unit 1. The amount of water supplied from the water supplying device 3 to the evaporator 23 can be recognized from the operation situation of the water supplying device 3.

Next, when the amount of water remaining in the evaporator 23 of the hydrogen generating unit 1 is estimated in Step S2a, the operation controller 11 calculates based on the estimated amount of water a time necessary for evaporating an appropriate amount of water in Step (b) shown as Step S4 in FIG. 7 to determine the timing for proceeding to Steps (c) and (d) in the second stage (Step S2b) of Step S2. The timing for proceeding to Step (c) determined in Step S2b is stored in the semiconductor memory of the operation controller 11. The appropriate amount of water evaporation in Step (b) is defined as an amount necessary for preventing the internal atmosphere of the sealed reformer 20 from becoming an atmosphere (steam concentration) which causes the steam oxidation of the reforming catalyst 20a.

Then, when the timing for proceeding to Step (c) is determined in Step S2b, the operation controller 11 sequentially executes Steps S3 to S7b as with the operations shown in Steps S2 to S6b of the hydrogen generator 100 shown in FIG. 5.

Here, as explained in Modification Example 1 of Embodiment 2, in Embodiment 2, the amount of raw material supplied from the raw material supplying device 4 to the hydrogen generating unit 1 (reformer 20) is associated with the amount of water supplied from the water supplying device 3 to the evaporator 23. Here, in Modification Example 2, the amount of water remaining in the evaporator 23 may be estimated based on the operating condition of the hydrogen generator 100, that is, the amount of raw material supplied from the raw material supplying device 4 to the hydrogen generating unit 1 (reformer 20).

As explained in Modification Example 1 of Embodiment 2, the temperature of the evaporator 23 included in the hydrogen generating unit 1 increases in proportion to the elapsed time since the start-up of the hydrogen generator 100. Here, in the present modification example, the amount of water remaining in the evaporator 23 may be estimated based on the operating condition of the hydrogen generator 100, that is, the operating time from the start-up of the hydrogen generator 100 until before the proceeding to Step (a) shown as Step S3 in FIG. 7 (before the output of the stop command).

In Modification Example 2, the heated state of the evaporator 23 can be recognized by the first temperature detector 24. Here, as with Modification Example 1 of Embodiment 2 and unlike the present modification example, the amount of water remaining in the evaporator 23 may be estimated based on the temperature detected by the first temperature detector 24 included in the hydrogen generating unit 1. Even with this configuration, the same effects as Modification Example 2 can be obtained.

The other points are the same as the operation of the hydrogen generator 100 shown in FIGS. 5 and 6.

As explained above in Modification Examples 1 and 2 of Embodiment 2, the amount of water remaining in the evaporator 23 can be estimated substantially accurately depending on situations by setting the duration time of Step (b) or the timing for proceeding to Step (c) to correspond to the operating condition of the hydrogen generator 100 while the hydrogen generator 100 stops. For example, this is because the amount of water remaining in the evaporator 23 is large when the amount of hydrogen-containing gas generated immediately before the stop command is large whereas the amount of water remaining in the evaporator 23 is small when the amount of hydrogen-containing gas generated immediately before the stop command is small. Therefore, in order to effectively suppress the deterioration of the catalyst characteristic due to the carbon deposition and the steam oxidation of the catalyst, an operation mode of the hydrogen generator 100 shown in Modification Examples 1 and 2 of Embodiment 2 is more preferable than an operation mode in which the time of Step (b) in which the water is evaporated by the evaporator 23 is set to be constant or the timing for proceeding to Step (c) in which the supply of the raw material stops is set to be constant.

Embodiment 3

Next, Embodiment 3 of the present invention will be explained.

Configuration of Hydrogen Generator 100

The hardware configuration of the hydrogen generator according to Embodiment 3 of the present invention is similar to that of the hydrogen generator according to Embodiment 2. Therefore, an explanation of the hardware configuration of the hydrogen generator according to Embodiment 3 of the present invention is omitted herein.

Operation of Hydrogen Generator 100

The operating method of the hydrogen generator according to Embodiment 3 of the present invention is basically the same as the operating method of the hydrogen generator 100 according to Embodiment 2. However, in the period in which the hydrogen generator stops, the operating method of the hydrogen generator according to Embodiment 3 of the present invention is partially different from the operating method of the hydrogen generator 100 according to Embodiment 2.

Hereinafter, only the differences between the operation of the hydrogen generator according to Embodiment 3 of the present invention and the operation of the hydrogen generator 100 according to Embodiment 2 will be explained.

Figure 8:
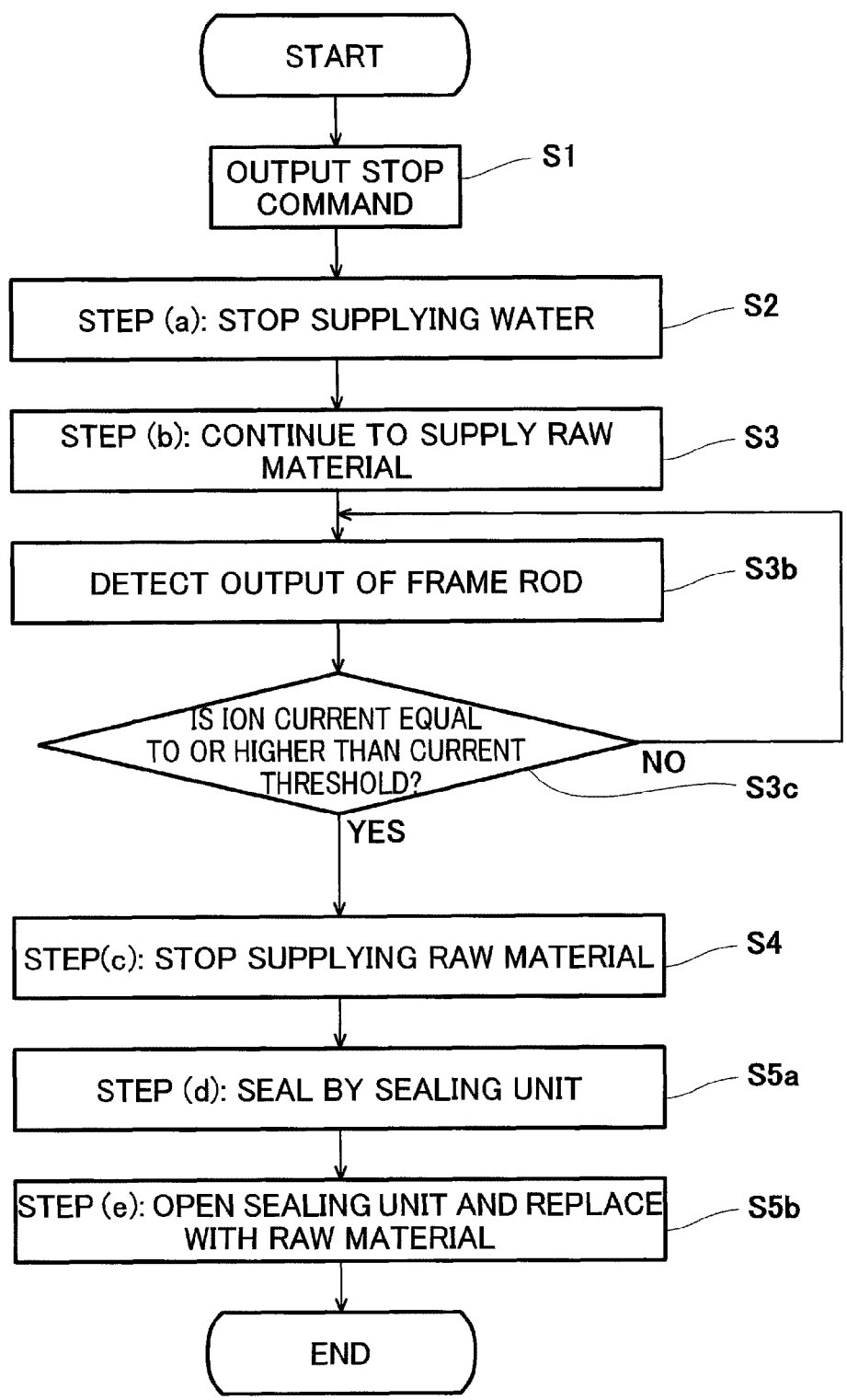
FIG. 8 is a flow chart schematically showing the characteristic operation stop method of the hydrogen generator according to Embodiment 3 of the present invention.

FIG. 8 is a flow chart schematically showing the characteristic operation stop method of the hydrogen generator according to Embodiment 3 of the present invention.

First, as with Embodiment 2, the stop command is output to the hydrogen generator 100 when it is determined that the generation of the hydrogen-containing gas is unnecessary any more in accordance with the electric power load of each home, the electric power load being reduced by, for example, stopping the external device, such as the fuel cell (Step S1). Next, when the stop command is output to the hydrogen generator 100, the operation controller 11 controls as with Embodiment 2 such that the operation step of the hydrogen generator 100 proceeds to Step (a), and the water supply from the water supplying device 3 to the evaporator 23 stops (Step S2). Then, the operation controller 11 continues to supply the raw material from the raw material supplying device 4 to the reformer 20 (Step S3).

As above, Steps S1 to S3 shown in FIG. 8 are the same as those of Embodiment 2, and the difference therebetween is that the flame rod 7 detects a water evaporation state after Step S3 shown in FIG. 8. Specifically, the difference therebetween is that: the output of the flame rod 7 is detected (Step S3b) instead of using the operating conditions of the hydrogen generator 100, such as the duration time, the amount of raw material or water supplied immediately before the stopping, and the operating time from the start-up until before the proceeding to Step (a); and when the ion current equal to or higher than a preset current threshold is detected by the flame rod 7 (Yes in Step S3c), the water evaporation state is recognized; and the operation step of the hydrogen generator 100 proceeds from Step (b) to Step (c) shown in Step S4. In a case where the ion current detected by the flame rod 7 is not the preset current threshold or higher (No in Step S3c), the operation controller 11 further detects the output of the flame rod 7.

More specifically, in the hydrogen generator 100, the surplus hydrogen-containing gas (off gas) is combusted in the heater 2 and utilized for the reforming reaction and the like except that the hydrogen-containing gas generated in the hydrogen generator 100 is almost completely consumed in the external device, such as the fuel cell. This is to improve the energy efficiency when generating the hydrogen. In the present embodiment, when the hydrogen generator 100 operates to steadily generate the hydrogen-containing gas, a part of the generated hydrogen-containing gas is supplied through the combustion gas supplying passage 10 to the heater 2 and combusted in the heater 2. At this time, in the present embodiment, the ion current in the flame generated by the combustion reaction in the combustor 2a of the heater 2 is detected using the flame rod 7 to detect whether or not the combustion reaction is continuing. Here, the ion current in the flame is proportional to the amount of hydrocarbon radical in the flame and increases or decreases in proportion to the concentration of hydrocarbon in the hydrogen-containing gas. For example, during a normal operation in which the raw material and the water are supplied to the hydrogen generating unit 1 (reformer 20) based on a predetermined steam carbon ratio and the temperature of the reformer 20 is controlled, the amount of ion current detected by the flame rod 7 does not significantly increase or decrease. In contrast, since the concentration of hydrocarbon in the hydrogen-containing gas is significantly affected by the steam carbon ratio in the reforming reaction, the detected ion current value significantly changes with time in Step (b) in which the ratio of the raw material and the steam changes with time (as time passes). Specifically, in Step (b) in which the water is evaporated in the evaporator 23 of the hydrogen generating unit 1, the amount of water evaporation decreases with time, but the supply of the raw material from the raw material supplying device 4 to the hydrogen generating unit 1 continues. Therefore, the steam carbon ratio decreases. As a result, the concentration of the hydrocarbon component in the hydrogen-containing gas increases. Then, since the heater 2 combusts the hydrogen-containing gas whose hydrocarbon component concentration has increased, the ion current value detected by the flame rod 7 increases. For example, if the concentration of the hydrocarbon component in the hydrogen-containing gas becomes twice, the ion current value becomes about twice. Therefore, by detecting the increase in the output of the flame rod 7, the decrease in the amount of water evaporation can be recognized.

Here, by focusing on the above-described technical content, the present embodiment realizes the operating method for carrying out Steps S3b and S3c after Step S2, recognizing the water evaporation state with time, and proceeding to Step (c) shown as Step S4 in which the supply of the raw material stops in a state where the water evaporation state is appropriate. The above-described appropriate water evaporation state in Step S2 is defined as a state where the water is evaporated, the amount of which is an amount necessary for preventing the internal atmosphere of the sealed reformer 20 from becoming the atmosphere (steam concentration) which causes the steam oxidation of the reforming catalyst.

By the operation stop method of the hydrogen generator 100 according to the present embodiment, the amount of water remaining in the evaporator 23 of the hydrogen generating unit 1 and the ratio of the raw material and the water during the operation stop of the hydrogen generator 100 can be appropriately recognized. Therefore, a high effect of preventing the catalyst characteristic from deteriorating by the carbon deposition and the steam oxidation of the catalyst can be obtained.

Then, when Step (c) is executed in Step S4, the operation controller 11 controls such that Steps S5a and S5b are sequentially executed in the same manner as the operations of Steps S6a and S6b of the hydrogen generator 100 shown in FIG. 5.

The relation between the ion current value and the amount of remaining water changes depending on the characteristic of the catalyst used in the hydrogen generator 100, the water evaporation state, the temperature of the reformer 20, the configuration of the flame rod 7, and the like. Therefore, the relation needs to be appropriately set for each hydrogen generator in order to effectively suppress the deterioration of the catalyst characteristic by the carbon deposition and the steam oxidation of the catalyst.

The present embodiment can obtain the same effects as Embodiment 2. Moreover, in accordance with the present embodiment, the water evaporation state in the evaporator 23 is sequentially monitored by utilizing the existing flame rod 7, and the raw material and the steam are stopped at the same time at an appropriate timing in the hydrogen generating unit 1. Therefore, the deterioration of the catalyst characteristic by the carbon deposition and the steam oxidation of the catalyst can be further surely and effectively suppressed.

The other points are the same as those in Embodiment 2.

Modification Example

Next, Modification Example of the hydrogen generator 100 according to Embodiment 3 will be explained.

Figure 9:
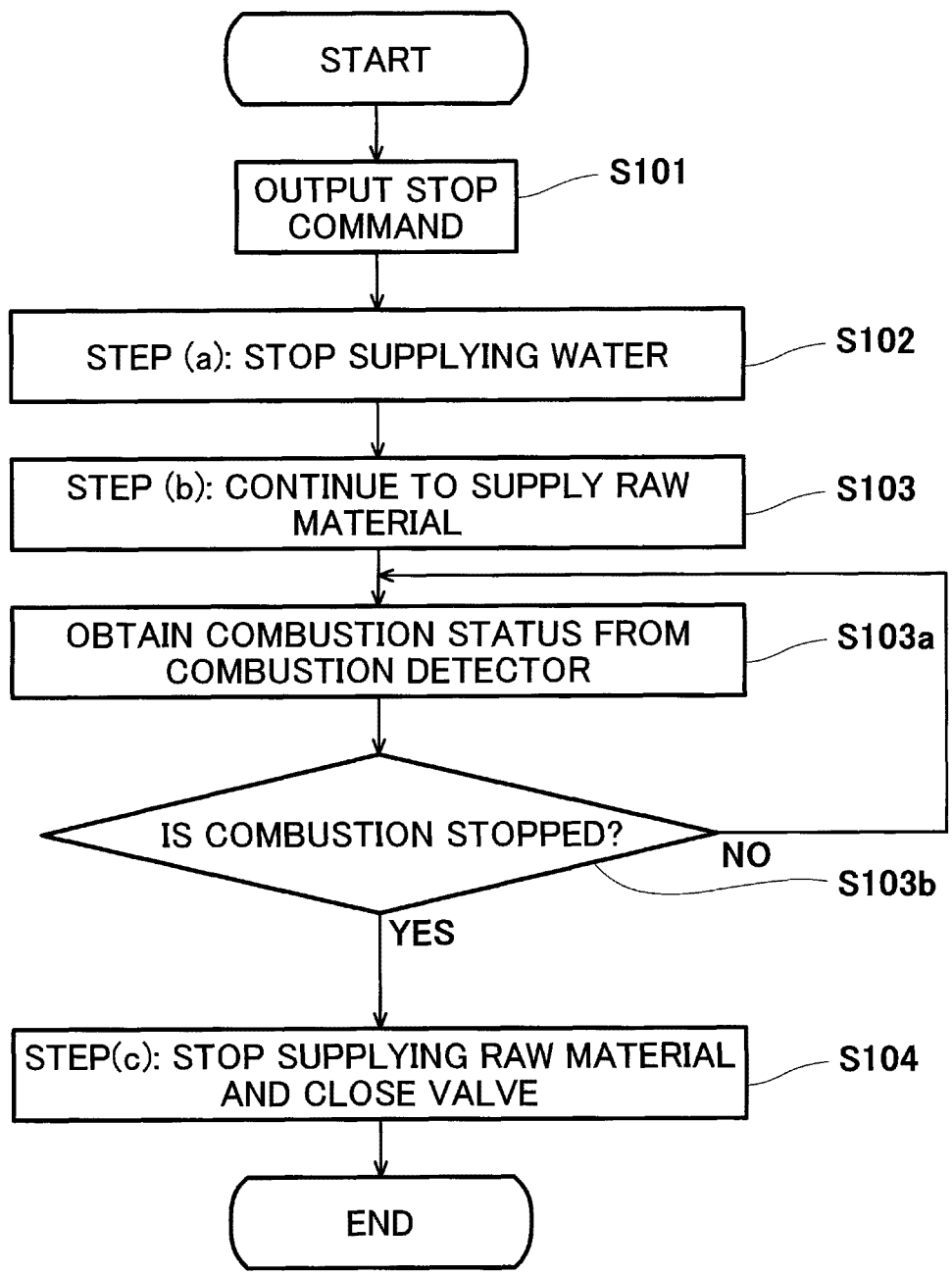
FIG. 9 is a flow chart schematically showing the operation stop process of the hydrogen generator according to Modification Example of Embodiment 3 of the present invention.

FIG. 9 is a flow chart schematically showing the operation stop process of the hydrogen generator of Modification Example of Embodiment 3.

The hydrogen generator 100 of the present modification example is one example in which the supply of the raw material from the raw material supplying device 4 to the reformer 20 continues until the combustion detector 7 detects combustion stop of the combustor 2a. Specifically, the controller 11 controls the raw material supplying device 4 in Step S103 shown in FIG. 9 such that the amount of raw material supplied to the combustor 2a is smaller than a combustion lower limit of the raw material with respect to the combustion air supplied to the combustor 2a. The combustion detector 7 may be any device as long as it can detect the combustion stop of the combustor 2a. For example, a flame rod may be used, or a temperature detector, such as a thermocouple, may be used to detect the temperature of the flame, the flue gas, or the like. To be specific, the raw material that is smaller in amount than the combustion lower limit is supplied to the reformer 20. Therefore, when the steam generation stops in the evaporator 23, only the raw material that is smaller in amount than the combustion lower limit with respect to the combustion air supplied to the combustor 2a is pushed out (is supplied) from the reformer 20 to the combustor 2a in Step S103. On this account, the combustor 2a cannot continue the combustion and stops the combustion, so that the temperature of the flame and the temperature of the flue gas decrease rapidly. Therefore, in the hydrogen generator 100 of the present modification example, when the combustion status of the combustor 2a is obtained in Step S103a and the combustion stops (Yes in Step S103b), the supply of the raw material from the raw material supplying device 4 to the reformer 20 stops, and the valve 12 is closed (Step S104).

The hydrogen generator 100 of the present modification example configured as above can obtain the same operational advantages as the hydrogen generator 100 according to Embodiment 3.

Embodiment 4

Figure 10:
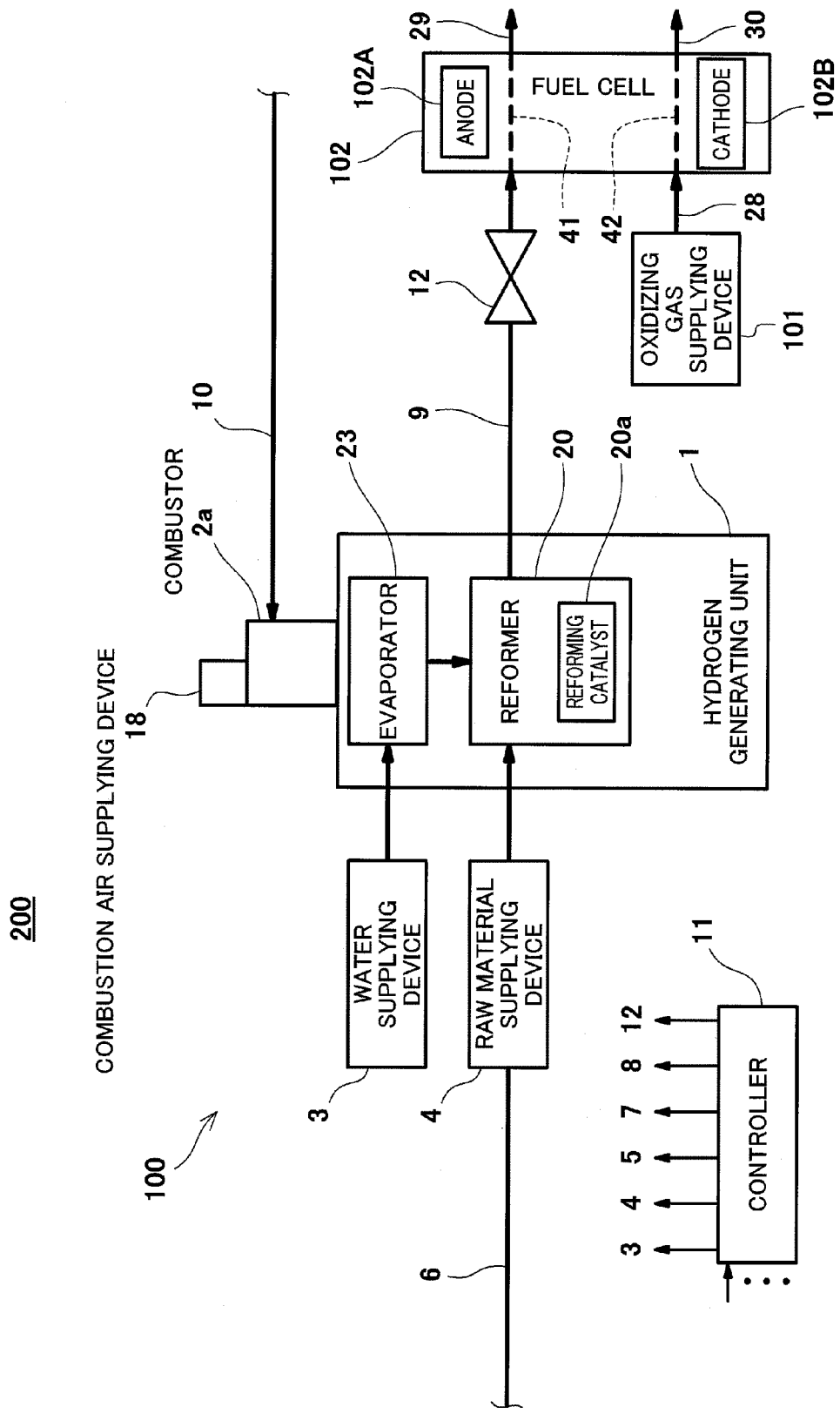
FIG. 10 is a schematic diagram showing a schematic configuration of the fuel cell system according to Embodiment 4 of the present invention.

FIG. 10 is a schematic diagram showing a schematic configuration of the fuel cell system according to Embodiment 4 of the present invention.

As shown in FIG. 10, a fuel cell system 200 according to Embodiment 4 of the present invention includes the hydrogen generator 100 according to Embodiment 1 and a fuel cell 102 configured to generate the electric power using the hydrogen-containing gas supplied from the hydrogen generator 100.

The fuel cell 102 includes an anode 102A and a cathode 102B. Moreover, the fuel cell 102 is provided with a fuel gas passage 41 and an oxidizing gas passage 42. The fuel gas passage 41 is configured such that the fuel gas (hydrogen-containing gas) is supplied to the anode 102A, and the oxidizing gas passage 42 is configured such that the oxidizing gas (herein, air) is supplied to the cathode 102B.

The fuel gas passage 41 of the fuel cell 102 has an upstream end connected to the hydrogen generator 100 (reformer 20) via the gas passage 9 and a downstream end connected to a fuel off gas passage 29. Moreover, the oxidizing gas passage 42 has an upstream end connected to an oxidizing gas supplying device 101 via an oxidizing gas supplying passage 28 and a downstream end connected to an oxidizing off gas passage 30.

In the fuel cell 102, the hydrogen-containing gas supplied to the anode 102A and the air supplied to the cathode 102B electrochemically react with each other. Thus, the electric power and the heat are generated. Then, the surplus hydrogen-containing gas unconsumed in the anode 102A and the surplus oxidizing gas unconsumed in the cathode 102B are discharged to the outside of the fuel cell system 200 (to the atmosphere). It is preferable that the surplus hydrogen-containing gas unconsumed in the anode 102A be discharged to the atmosphere after it is combusted by a fuel off gas processor, not shown, or diluted by the air. Moreover, in a case where the hydrogen generator 100 includes the combustor 2a, the hydrogen-containing gas unconsumed in the anode 102A may be used as the combustion fuel of the combustor 2a.

In Embodiment 4, the controller 11 is configured to control not only the hydrogen generator 100 but also the other components constituting the fuel cell system 200. Then, the controller 11 is configured to carry out the stop process of the hydrogen generator 100 as described in Embodiment 1 while the fuel cell system 200 stops.

Therefore, the fuel cell system 200 according to Embodiment 4 has the same operational advantages as the hydrogen generator 100 according to Embodiment 1.

The fuel cell system 200 according to Embodiment 4 is configured to include the hydrogen generator 100 according to Embodiment 1. However, the present embodiment is not limited to this. The fuel cell system 200 according to Embodiment 4 may be configured to include the hydrogen generator 100 according to any one of Embodiments 2 to 4 and Modification Examples of Embodiments 1 to 3.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. Moreover, various inventions can be made by suitable combinations of a plurality of components disclosed in the above embodiments.

INDUSTRIAL APPLICABILITY

The hydrogen generator according to the present invention, the fuel cell system including the hydrogen generator, and the method for operating the hydrogen generator are useful in the field of fuel cells since the deterioration of the reforming catalyst by the steam oxidation while the hydrogen generator stops is suppressed than before.

REFERENCE SIGNS LIST 1 hydrogen generating unit
2a combustor
2 heater
2 combustor
3 water supplying device
4 raw material supplying device
5 desulfurizer
6 gas infrastructure line
7 flame rod (combustion detector)
8 air supplying device
9 gas passage (hydrogen-containing gas supplying passage)
10 combustion gas supplying passage
11 controller (operation controller)
12 valve (sealing unit)
12A valve
13 water supplying opening
14 material supplying opening
15 hydrogen-containing gas outlet port
16 air supplying opening
17 flue gas outlet port
18 combustion air supplying device (combustion fan)
19 mixer
20a reforming catalyst
20 reformer
21 second temperature detector
22 gas passage
23 evaporator
24 first temperature detector
25 shift converter
26 selective oxidizer
27 discharging passage
28 oxidizing gas supplying passage
29 fuel off gas passage
30 oxidizing off gas passage
41 fuel gas passage
42 oxidizing gas passage
100 hydrogen generator
101 oxidizing gas supplying device
102 fuel cell
102A anode
102B cathode
200 fuel cell system

The invention claimed is:

1. A hydrogen generator comprising:
a raw material supplying device configured to supply a raw material;
a water supplying device configured to supply water;
an evaporator configured to evaporate the water supplied from the water supplying device to generate steam;
a reformer having a reforming catalyst which generates a hydrogen-containing gas by a reforming reaction using the raw material and the steam;
a heater configured to supply reaction heat necessary for the reforming reaction in the reformer; and
a controller including a memory storing a program,
wherein the program, when executed by the controller, causes the controller to:
stop supplying the water from the water supplying device and cause the heater to continuously heat the reformer even after the supply of the water from the water supplying device is stopped,
then continue supplying the raw material from the raw material supplying device, and
then, stop supplying the raw material from the raw material supplying device and stop causing the heater to heat the reformer before the steam in the reformer is purged with the supplied raw material.

2. The hydrogen generator according to claim 1, further comprising:
a valve disposed on a gas passage to cause the reformer to be communicated with an atmosphere and block the reformer from the atmosphere, the gas passage being located downstream of the reformer,
wherein the supplying the raw material from the raw material supplying device is continued with the valve open, and
when the supplying the raw material from the raw material supplying device is stopped before the steam in the reformer is purged with the supplied raw material, the valve is closed by the controller.

3. The hydrogen generator according to claim 1, wherein depending on an operating condition of the hydrogen generator before the water supplying device stops supplying the water, the program further causes the controller to control a time in which the raw material supplying device continues to supply the raw material.

4. The hydrogen generator according to claim 3, wherein the operating condition of the hydrogen generator is a raw material supply amount, a water supply amount, or an operating time of the hydrogen generator.

5. The hydrogen generator according to claim 2, wherein the program further causes the controller to control the raw material supplying device such that the steam in the reformer is purged with the raw material in a case where a temperature inside the reformer becomes equal to or lower than a predetermined temperature after the valve is closed, the predetermined temperature being a temperature at which carbon deposition by the raw material does not occur.

6. The hydrogen generator according to claim 2, wherein the program further causes the controller to stop supplying the raw material from the raw material supplying device and closes the valve before the evaporator stops generating the steam.

7. The hydrogen generator according to claim 1, wherein the program further causes the controller to continue supplying the raw material from the raw material supplying device at least until the evaporator stops generating the steam.

8. The hydrogen generator according to claim 1, wherein:
the heater includes a combustor configured to heat the reformer,
the hydrogen generator further comprises:
a discharging passage through which a gas discharged from the reformer flows, the discharging passage being communicated with the combustor; and
a combustion detector configured to detect a combustion status of the combustor, and
the program further causes the controller to continue supplying the raw material from the raw material supplying device at least until the combustion detector detects combustion stop of the combustor.

9. A fuel cell system comprising:
the hydrogen generator according to any one of claims 1 to 8; and
a fuel cell configured to generate electric power using the hydrogen-containing gas supplied from the hydrogen generator.

10. The hydrogen generator according to claim 2, wherein:
the heater includes a combustor configured to heat the reformer, the hydrogen generator further comprises:
- a discharging passage through which a gas discharged from the reformer flows, the discharging passage being communicated with the combustor; and
- a combustion detector configured to detect a combustion status of the combustor by an ion current, and the program further causes the controller to stop supplying the raw material from the raw material supplying device and closes the valve in a case where the combustion detector detects the ion current that is equal to or higher than a predetermined threshold.

11. The method for operating a hydrogen generator according to claim 2, wherein even after the supply of the water from the water supplying device is stopped, the heater combusts the hydrogen-containing gas, whose hydrocarbon component concentration has increased, to heat the reformer.

12. The hydrogen generator according to claim 1, wherein the program further causes the controller to, even after the supply of the water from the water supplying device is stopped, cause the heater to combust the hydrogen-containing gas, whose hydrocarbon component concentration has increased, to heat the reformer.

13. A method for operating a hydrogen generator,
the hydrogen generator including: a raw material supplying device configured to supply a raw material; a water supplying device configured to supply water; an evaporator configured to evaporate the water supplied from the water supplying device to generate steam; a reformer having a reforming catalyst which generates a hydrogen-containing gas by a reforming reaction using the raw material and the steam; and a heater configured to supply reaction heat necessary for the reforming reaction in the reformer, the method comprising steps of:
(a) stopping supplying the water from the water supplying device and causing the heater to continuously heat the reformer even after the supply of the water from the water supplying device is stopped;
(b) after step (a), continuing supplying the raw material from the raw material supplying device; and
(c) after step (b), stopping supplying the raw material from the raw material supplying device and stopping causing the heater to heat the reformer before the steam in the reformer is purged with the raw material.

* * * * *